United States Patent
Gaal et al.

(10) Patent No.: US 9,264,997 B2
(45) Date of Patent: Feb. 16, 2016

(54) APPARATUS AND METHODS OF ENERGY EFFICIENT COMMUNICATION

(71) Applicant: QUALCOMM Incorporated, San Diego, CA (US)

(72) Inventors: Peter Gaal, San Diego, CA (US); Hao Xu, San Diego, CA (US); Wanshi Chen, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 283 days.

(21) Appl. No.: 13/925,422

(22) Filed: Jun. 24, 2013

(65) Prior Publication Data

US 2014/0010131 A1 Jan. 9, 2014

Related U.S. Application Data

(60) Provisional application No. 61/667,612, filed on Jul. 3, 2012.

(51) Int. Cl.
*H04L 5/00* (2006.01)
*H04W 76/04* (2009.01)
*H04W 52/02* (2009.01)

(52) U.S. Cl.
CPC ........... *H04W 52/0229* (2013.01); *H04L 5/001* (2013.01); *H04L 5/0048* (2013.01); *H04L 5/0055* (2013.01); *H04L 5/0098* (2013.01); *H04W 76/048* (2013.01); *H04L 5/0023* (2013.01); *Y02B 60/50* (2013.01)

(58) Field of Classification Search
None
See application file for complete search history.

(56) References Cited

U.S. PATENT DOCUMENTS

2006/0280113 A1* 12/2006 Huo .............................. 370/208
2009/0191883 A1* 7/2009 Choi et al. .................... 455/450
2010/0279715 A1 11/2010 Alanara et al.
(Continued)

FOREIGN PATENT DOCUMENTS

WO WO-2009/014248 A1 1/2009
WO WO-2011/126414 A1 10/2011

OTHER PUBLICATIONS

International Search Report and Written Opinion issued in Application No. PCT/US2013/047517, mailed Jan. 21, 2014, 13 pages.
(Continued)

*Primary Examiner* — Hoon J Chung
(74) *Attorney, Agent, or Firm* — Arent Fox LLP

(57) ABSTRACT

A method of energy efficient wireless communication, including obtaining a signal pattern defining resources for use in transmitting or receiving signals with variable signal density over time, the signals including a plurality of signals defining a signal burst, configuring the resources based on the signal pattern, including aligning a discontinuous reception (DRX) period with the signal burst, and transmitting or receiving the signals, including the signal burst aligned with the DRX period, according to the signal pattern to achieve variable density signal transmission or reception over time. Additionally, a method may include obtaining a signal pattern that defines a first set of signals with a first density and a first periodicity and a second set of signals with a second density different than the first density and a second periodicity different than the first periodicity, and communicating reference signals among the plurality of communications devices based on the signal pattern.

38 Claims, 15 Drawing Sheets

(56) References Cited

U.S. PATENT DOCUMENTS

| | | | |
|---|---|---|---|
| 2011/0294491 A1 | 12/2011 | Fong et al. | |
| 2012/0082192 A1 | 4/2012 | Pelletier et al. | |
| 2012/0207040 A1 | 8/2012 | Comsa et al. | |
| 2013/0039347 A1 | 2/2013 | Moqvist | |
| 2015/0009898 A1* | 1/2015 | Rosa et al. | 370/328 |

OTHER PUBLICATIONS

NEC, "DRX for Mixed Traffic Scenarios," 3GPP TSG-RAN2 Meeting #59, Athens, Greece, Aug. 20-24, 2007, XP002507131, pp. 1-4.

NTT Docomo, Inc., "Views on DRX/DTX Control in LTE," 3GPP TSG-RAN WG2 #56, Nov. 6-10, 2006, Riga, Latvia, pp. 1-3, URL: ftp://ftp.3gpp.org/tsg_ran/WG2_RL2/TSG R2 56/Documents/R2-063397.zip.

Taiwan Search Report—TW102123820—TIPO—Mar. 23, 2015 (123235TW), (1 page).

Liang, Jia-Ming, et al., "An Energy-Efficient Sleep Scheduling With QoS Consideration in 3GPP LTE-Advanced Networks for Internet of Things," IEEE Journal on Emerging and Selected Topics in Circuits and Systems. vol. 3, No. 1, Mar. 2013.

* cited by examiner

APPARATUS AND METHODS OF ENERGY EFFICIENT COMMUNICATION

CLAIM OF PRIORITY UNDER 35 U.S.C. §119

The present application for patent claims priority to U.S. Provisional Application No. 61/667,612 entitled "APPARATUS AND METHODS OF ENERGY EFFICIENT COMMUNICATION SYSTEM DESIGN", filed Jul. 3, 2012, and assigned to the assignee hereof and hereby expressly incorporated by reference herein.

BACKGROUND

1. Field

Aspects of the present disclosure relate generally to wireless communication systems, and more particularly, to supporting energy efficient signaling in a network device and/or a user equipment.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations, also referred to as nodeBs or eNodeBs (eNBs), which can support communication for a number of user equipments (UEs). A UE may communicate with a base station via a downlink and an uplink. The downlink (or forward link) refers to a communication link from the base station to the UE, and the uplink (or reverse link) refers to a communication link from the UE to the base station. In an example, a base station can assign a number of downlink and/or uplink resources to a UE. Moreover, the base station can allow the UE to establish multiple carriers for communicating with the base station over the downlink or uplink using multiple physical or virtual antennas or other radio resources to improve communication throughput.

Due to the ever increasing popularity of wireless communications, efficiently utilizing the limited resources of both the base stations and UEs has become a concern.

One manner in which this concern is addressed in 3GPP Long Term Evolution (LTE) Release 11 (Rel-11) through the definition of a new carrier type, also referred to as an extension carrier, which may provide enhanced spectral efficiency by removing unneeded synchronization signals, and which also may provide enhanced energy efficiency.

Moreover, current agreements or operating assumptions include the base station transmitting certain synchronization signals with increased periodicity. The proposed increase in separation of the synchronization signals may not provide sufficient energy savings, however, and further separation of the signals may lead to possible delays in communications as well as possible user congestion.

Accordingly, improved mechanisms or techniques for more energy efficient signaling are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method of energy efficient wireless communication is provided that includes obtaining a signal pattern defining resources for use in transmitting or receiving signals with variable signal density over time, wherein the signals include a plurality of signals defining a signal burst; configuring the resources based on the signal pattern, including aligning a discontinuous reception (DRX) period with the signal burst; and transmitting or receiving the signals, including the signal burst aligned with the DRX period, according to the signal pattern to achieve variable density signal transmission or reception over time.

In one aspect, a computer program product for energy efficient wireless communication is provided that includes a computer-readable medium, including code for causing at least one computer to obtain a signal pattern defining resources for use in transmitting or receiving signals with variable signal density over time, wherein the signals include a plurality of signals defining a signal burst aligned with a discontinuous reception (DRX) period; code for causing the at least one computer to configure the resources based on the signal pattern; and code for causing the at least one computer to transmit or receive the signals, including the signal burst aligned with the DRX period, according to the signal pattern to achieve the variable signal density over time.

In one aspect, an apparatus for energy efficient wireless communication is provided that includes means for obtaining a signal pattern defining resources for use in transmitting or receiving signals with variable signal density over time, wherein the signals include a plurality of signals defining a signal burst aligned with a discontinuous reception (DRX) period; means for configuring the resources based on the signal pattern; and means for transmitting or receiving the signals, including the signal burst aligned with the DRX period, according to the signal pattern to achieve the variable signal density over time.

In one aspect, an apparatus for energy efficient wireless communication system is provided that includes at least one processor; and a memory coupled to the at least one processor; wherein the at least one processor is configured to obtain a signal pattern defining resources for use in transmitting or receiving signals with variable signal density over time, wherein the signals include a plurality of signals defining a signal burst aligned with a discontinuous reception (DRX) period; configure the resources based on the signal pattern; and transmit or receive the signals, including the signal burst aligned with the DRX period, according to the signal pattern to achieve the variable signal density over time.

In one aspect, a method of energy efficient wireless communication among a plurality of communications devices is provided that includes obtaining a signal pattern that defines a first set of signals with a first density and a first periodicity and a second set of signals with a second density different than the first density and a second periodicity different than the first periodicity; and communicating reference signals among the plurality of communications devices based on the signal pattern.

In one aspect, a computer program product for energy efficient wireless communication is provided that includes a computer-readable medium, including code for obtaining a signal pattern that defines a first set of signals with a first density and a first periodicity and a second set of signals with a second density different than the first density and a second periodicity different than the first periodicity; and code for communicating reference signals among the plurality of communications devices based on the signal pattern.

In one aspect, an apparatus for energy efficient wireless communication is provided that includes means for obtaining a signal pattern that defines a first set of signals with a first density and a first periodicity and a second set of signals with a second density different than the first density and a second periodicity different than the first periodicity; and means for communicating reference signals among the plurality of communications devices based on the signal pattern.

In one aspect, an apparatus for energy efficient wireless communication system is provided that includes at least one processor; and a memory coupled to the at least one processor; wherein the at least one processor is configured to obtain a signal pattern that defines a first set of signals with a first density and a first periodicity and a second set of signals with a second density different than the first density and a second periodicity different than the first periodicity; and communicate reference signals among the plurality of communications devices based on the signal pattern.

These and other aspects will become more fully understood upon a review of the detailed description, which follows.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
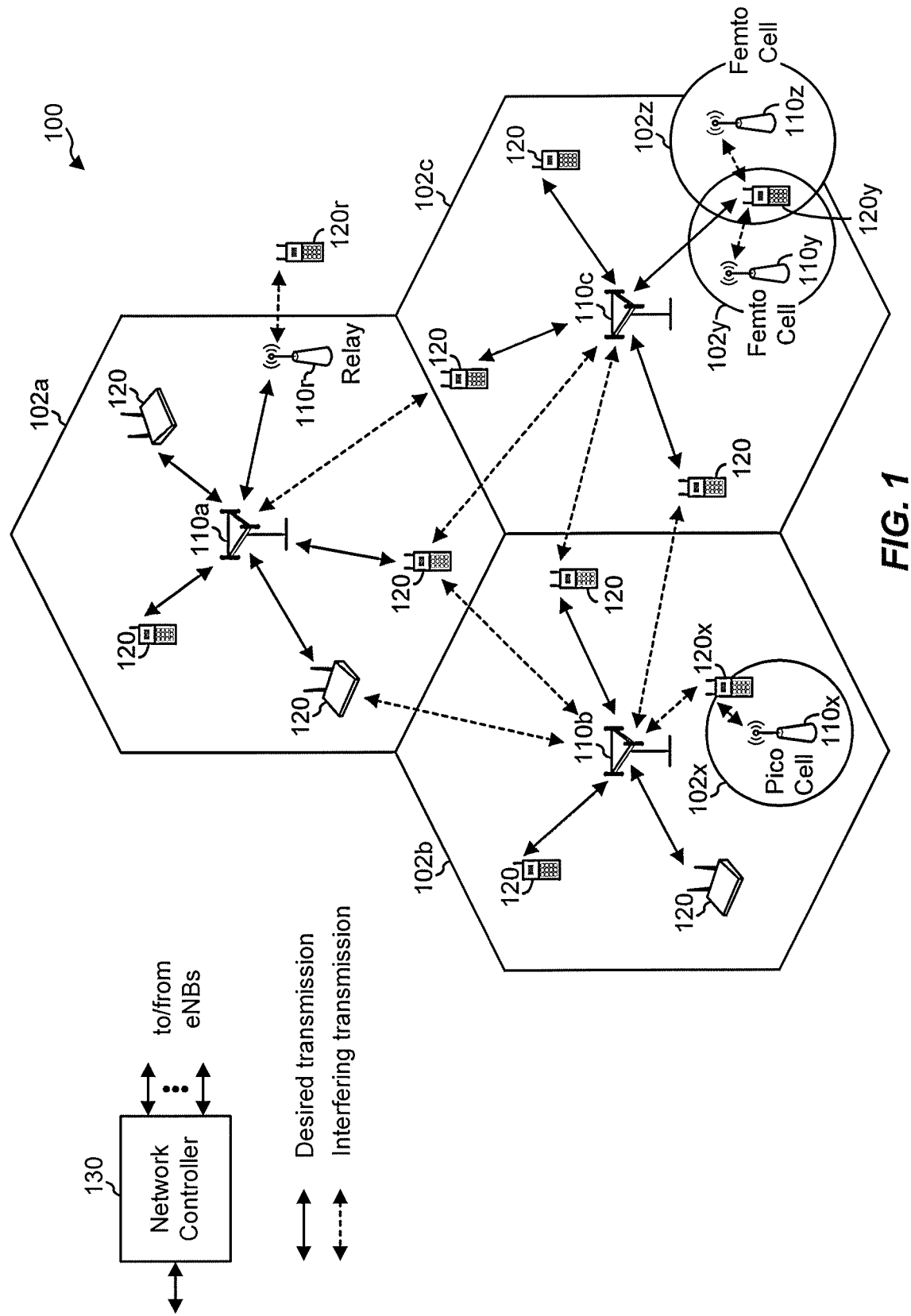
FIG. 1 is a block diagram conceptually illustrating an example of a telecommunications system.

FIG. 1 shows a wireless communication network 100, which may be an LTE network. The wireless network 100 may include a number of evolved Node Bs (eNBs) 110 and other network entities. An eNB may be a station that communicates with the user equipments (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a device, a terminal, a mobile station, a subscriber unit, a station, a smart phone, etc. A UE may be a cellular phone, a personal digital assistant (PDA), a wireless modem (or other tethered device), a wireless communication device, a handheld device, a laptop computer, a tablet or netbook computer, a cordless phone, a wireless local loop (WLL) station, etc. A UE may be able to communicate with macro eNBs, pico eNBs, femto eNBs, relays, etc. For example, UE 120x may communicate with eNB 110x which may be a pico eNB of pico cell 102x, and UE 120y may communicate with eNB 110y or eNB 110z which may be femto eNBs of femto cells 102y and 102z, respectively. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.4, 3, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.4, 3, 5, 10 or 20 MHz, respectively.

Figure 2:
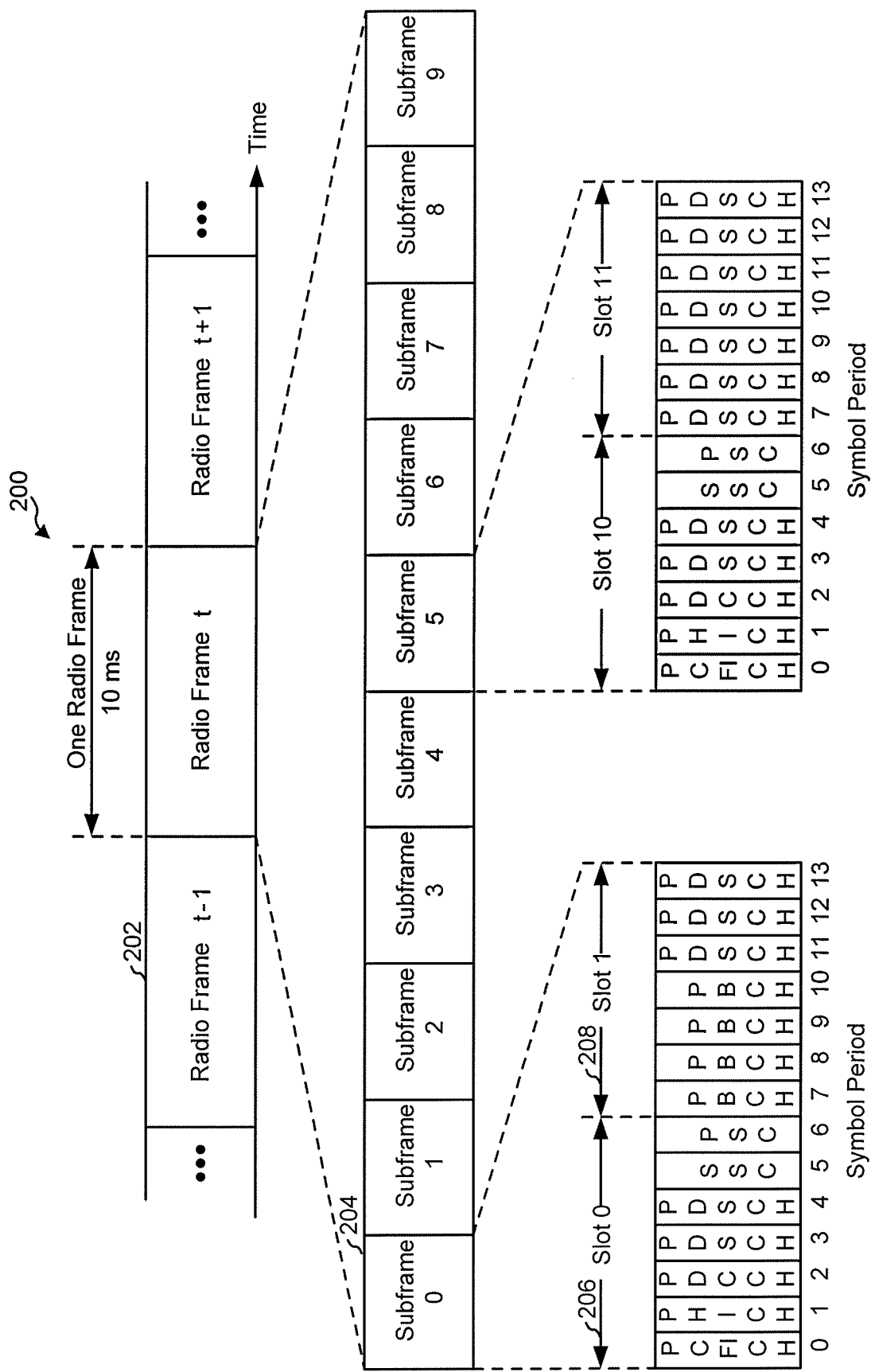
FIG. 2 is a block diagram conceptually illustrating an example of a downlink frame structure in a telecommunications system.

FIG. 2 shows a down link frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 204. Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical hybrid automatic repeat/request (HARQ) Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc. Moreover, it is to be appreciated that the UE can utilize a similar subframe and slot structure to communicate with the eNB on the uplink. For example, the UE can transmit physical uplink control channel (PUCCH), physical uplink shared channel (PUSCH), sounding reference signal (SRS), or other communications over one or more symbol periods in one or more slots of a subframe.

Figure 3:
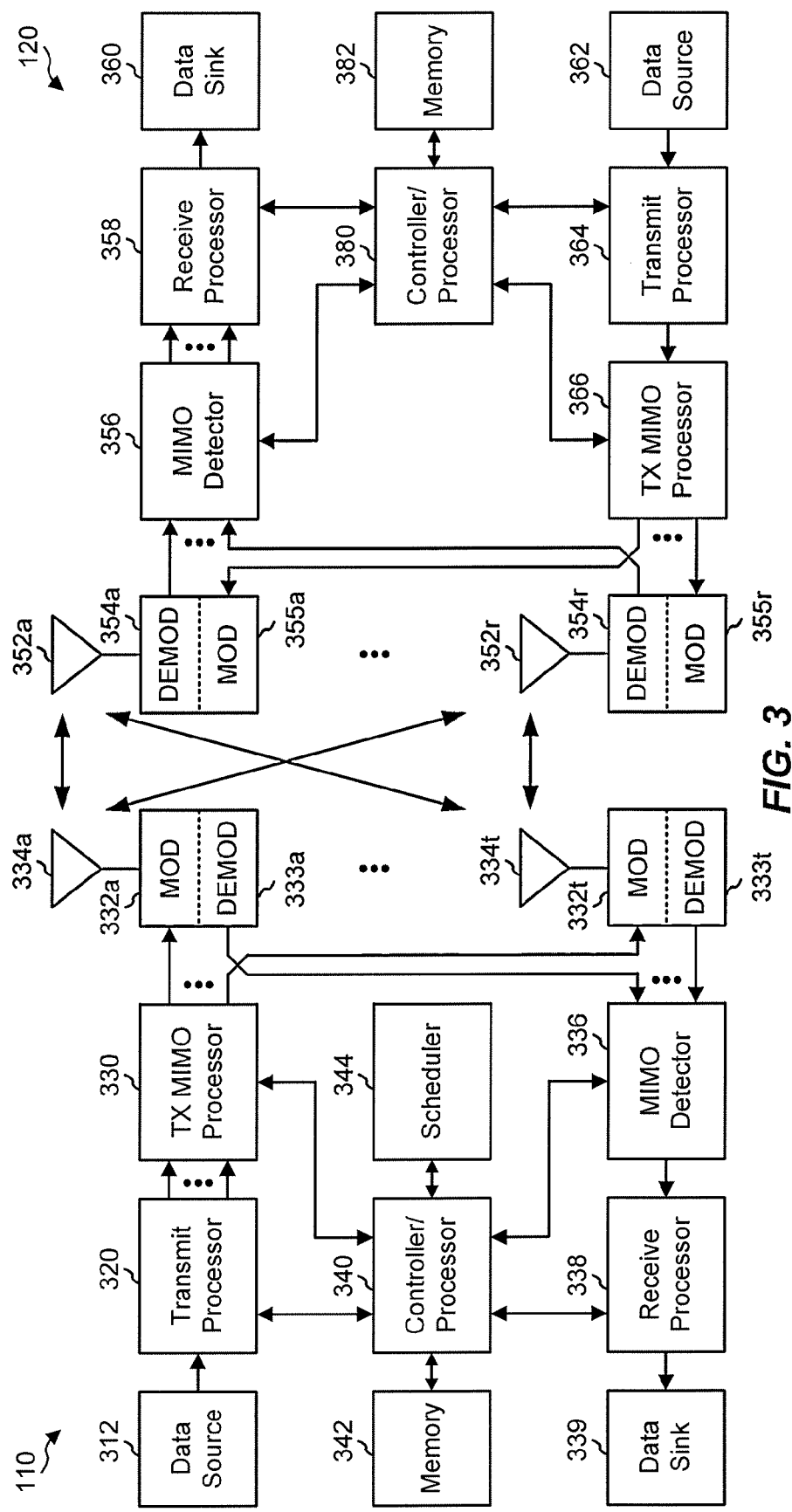
FIG. 3 is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 355a through 355r (e.g., for SC-FDM, etc.), and transmitted to the base station 110. At the base station 110, the uplink signals from the UE 120 may be received by the antennas 334, processed by the demodulators 333a through 333t, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIG. 8, and/or other processes for the techniques described herein. In addition, for example, the processor 380 can comprise or at least be operatively coupled to modules illustrated in FIGS. 12 and 14 for performing aspects described herein. The memories 342 and 382 may store data and program codes for the base station 110 and the UE 120, respectively, which can include instructions for executing the methods in FIGS. 6, 11, and 13, the modules in FIGS. 8, 12, and 14, and/or the like. A scheduler 344 may schedule UEs for data transmission on the downlink and/or uplink.

Carrier Aggregation

LTE-Advanced UEs can use spectrum in 20 MHz bandwidths allocated in a carrier aggregation of up to a total of 100 MHz (5 component carriers) for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments can conserve spectrum and are a good fit for the typically asymmetric bandwidth utilization by broadband subscribers, though other assignments can be possible.

Carrier Aggregation Types

Figure 4A:
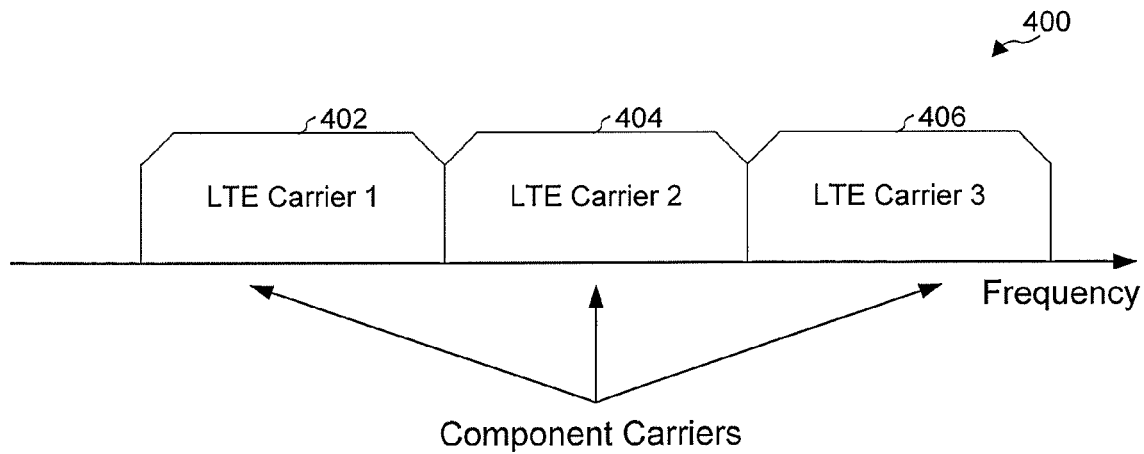
FIG. 4A discloses a continuous carrier aggregation type.
Figure 4B:
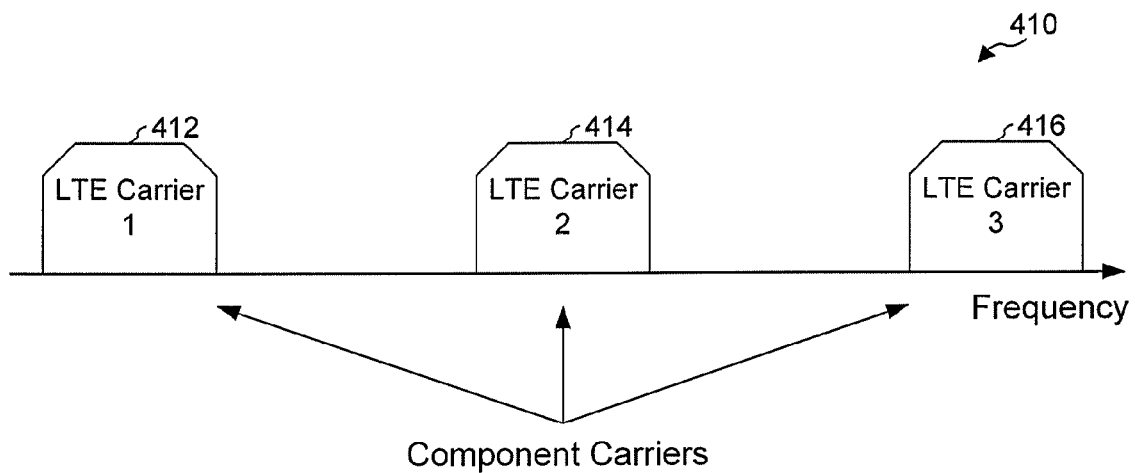
FIG. 4B discloses a non-continuous carrier aggregation type.

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA operate to aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
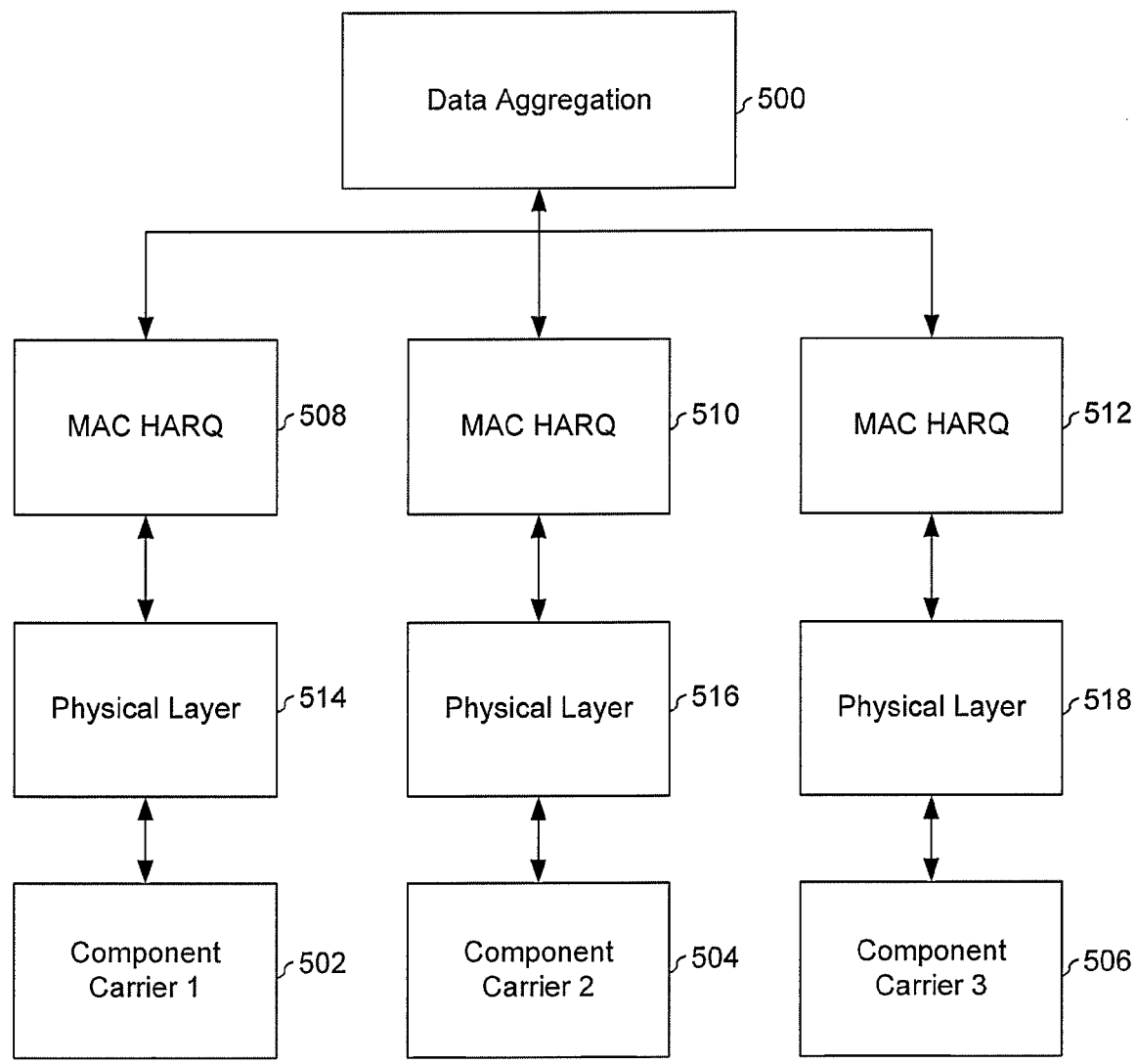
FIG. 5 discloses MAC layer data aggregation.

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer. Similarly, in the physical layer, one physical layer entity 514, 516, and 518 can be provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced (e.g., for the dedicated control channel).

Multiple control channels for different component carriers are jointly coded and then transmitted over the entire frequency band formed by a third CA method. This approach offers low signaling overhead and high decoding performance in control channels, at the expense of high power consumption at the UE side. However, this method may not be compatible with LTE systems.

Handover Control

It is preferable to support transmission continuity during the handover procedure across multiple cells when CA is used for an IMT-Advanced UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
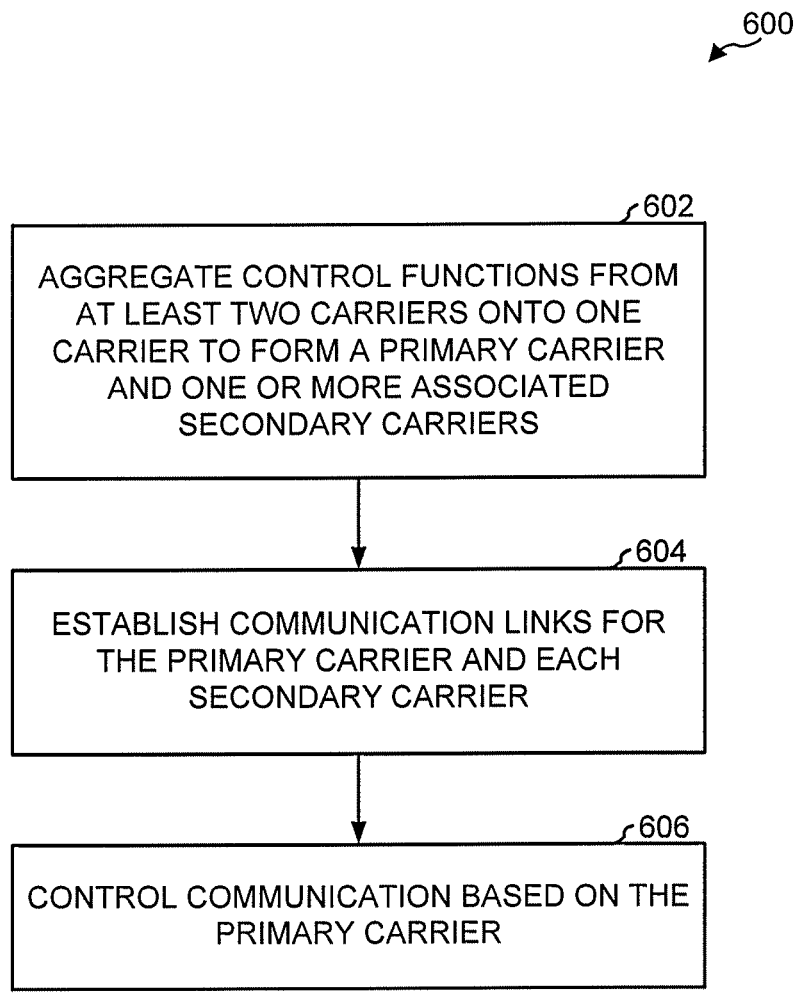
FIG. 6 is a flow chart illustrating a methodology for controlling radio links in multiple carrier configurations.

FIG. 6 illustrates a methodology 600 for controlling radio links in a multiple carrier wireless communication system by grouping physical channels according to one example. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Enhanced PDCCH (ePDCCH)

In LTE Release 11 (Rel-11), a new control channel structure referred to as enhanced Physical Downlink Control Channel (ePDCCH) is introduced. Unlike legacy PDCCH, which occupies the first several control symbols in a subframe, ePDCCH occupies the data region, similar to Physical Downlink Shared Channel (PDSCH).

Figure 7:
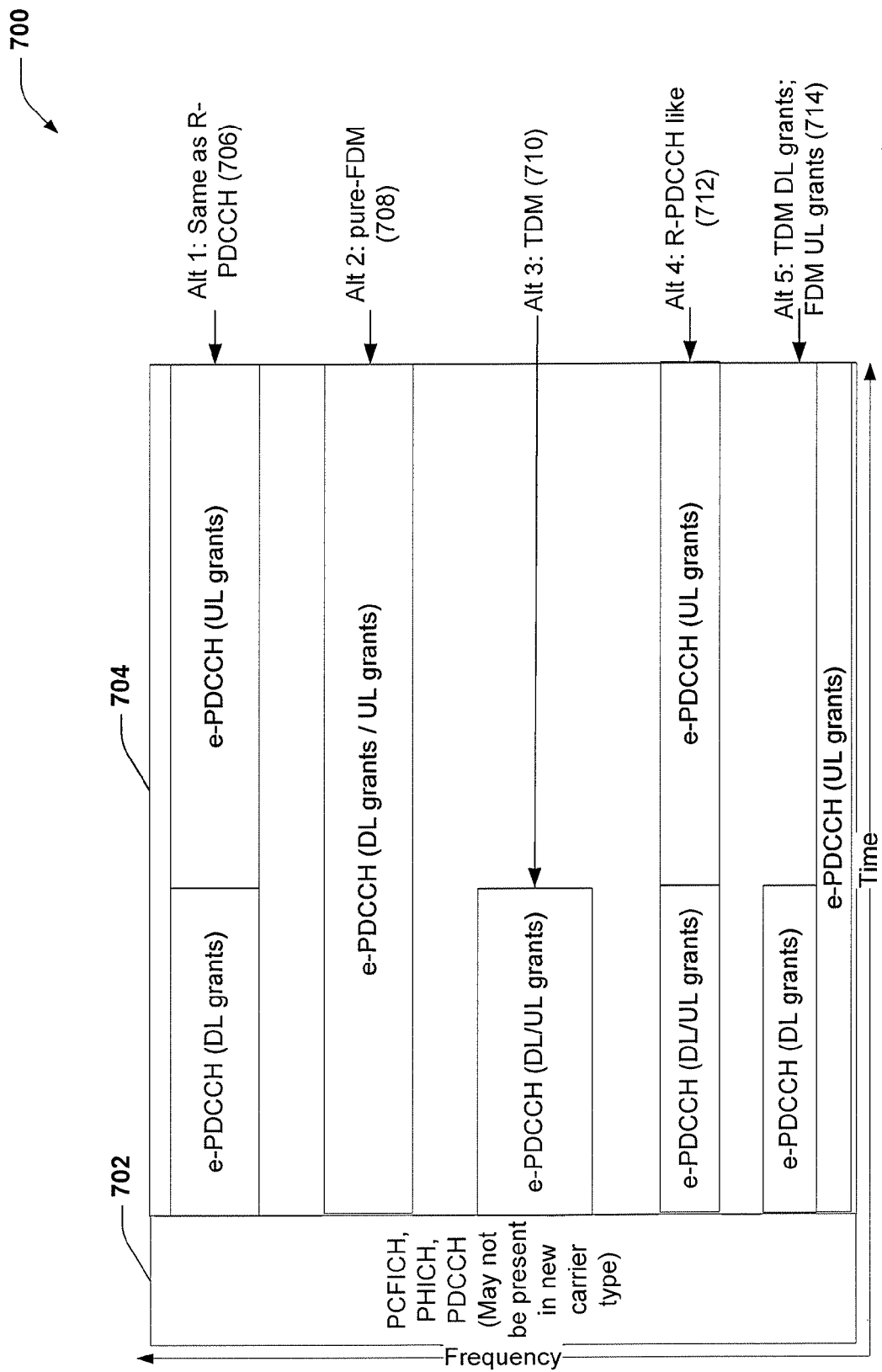
FIG. 7 illustrates example resource allocations for a plurality of enhanced control channel designs.

FIG. 7 illustrates various example ePDCCH structures 700 in an example portion of time over a portion of frequency, which can be a subframe. For example, a portion of initial resources in the subframe can be reserved for a legacy control region 702 for communicating control data to legacy devices, which can include PDCCH, PCFICH, PHICH, and/or similar channels. In LTE, the legacy control region 702 can be a number of OFDM symbols, n, in the subframe where n can be between one and three. It is to be appreciated that where ePDCCH is defined for a new carrier type, the legacy control region 702 may not be present. In any case, the remaining resources can comprise a data region 704 of the subframe. Thus, unlike legacy PDCCH, ePDCCH for a new carrier type may occupy only the data region 704.

Five alternatives are depicted for defining an enhanced control channel structure, though it is to be appreciated that other alternatives are possible. For example, an enhanced control channel structure can support increased control channel capacity, support frequency domain inter-cell interference coordination (ICIC), achieve improved spatial reuse of control channel resources, support beamforming and/or diversity, operate on a new carrier type and in Multicast/Broadcast over Single Frequency Network (MBSFN) subframes, coexist on the same carrier as legacy devices, etc.

In alternative 1 706, the enhanced control channel structure can be similar to relay-PDCCH (R-PDCCH), such that downlink grants are assigned over the control channel in at least a portion of frequency over a first portion of region 704, and uplink grants are assigned over the control channel in the portion of frequency over a second portion of the region 704. In alternative 2 708, the enhanced control channel structure allows downlink and uplink grants to be assigned over a portion of frequency in region 704 spanning both the first and the second slots. In alternative 3 710, the enhanced control channel structure allows downlink and uplink grants to be assigned over a portion of frequency using TDM in at least a portion of region 704. In alternative 4 712, the enhanced control channel structure allows downlink and uplink grants to be assigned over the control channel in at least a portion of frequency over a first portion of region 704, and uplink grants are assigned over the control channel in the portion of frequency over a second portion of the region 704. In alternative 5 714, downlink grants can be assigned using TDM over at least a portion of region 704, while uplink grants can be assigned using FDM in a different, and optionally overlapping, portion of frequency over region 704.

Using one or more of the alternatives, it is to be appreciated that an enhanced control channel can allow assignment of resources using various multiplexing schemes for downlink and/or uplink assignments as compared to conventional legacy control channel structures.

Additionally, for ePDCCH, one or more additional conditions or agreements may apply. For example, both localized and distributed transmission of the ePDCCH may be supported. In this case, at least for localized transmission, and for distributed transmission where a Common Reference Signal (CRS) is not used for demodulation of the enhanced control channel, the demodulation of the enhanced control channel is based on a DeModulation-Reference Signal (DM-RS) transmitted in one or more Physical Resource Block(s) (PRB(s)) used for transmission of the enhanced control channel.

Further, for example, in some cases ePDCCH messages may span both the first and second slots (e.g., FDM based ePDCCH) with a restriction on a maximum number of Transport CHannel (TrCH) bits receivable in a Transmission Time Interval (TTI), e.g. to allow a relaxation of the processing requirements for the UE. Also, for example, multiplexing of PDSCH and ePDCCH within a PRB pair may not be permitted.

Moreover, for example, in some cases Rank-2 single-user MIMO (SU-MIMO) is not supported for a single blind decoding attempt. And, the same scrambling sequence generator may be used for ePDCCH DM-RS as for PDSCH DM-RS.

Thus, resource assignment for an enhanced control channel can be defined to accommodate one or more of the enhanced alternative control channel structures.

New Carrier Type

The following concepts can be applied to a new carrier type (NCT) or an extension carrier, a single carrier, two or more carriers in CA, coordinated multiple point (COMP), and/or any non-backward compatible carrier, such as an LTE Release 11 (Rel-11) new carrier type, allowing resource granting within resources of various portions of a subframe. In an aspect, the new carrier type or extension carrier may be a carrier that is supported in addition to LTE Release 8 (Rel-8) carriers. In some aspects, the new carrier type or extension carrier may be an extension of another carrier, and as such, may have to be accessed as a part of a carrier aggregation set.

Energy Efficient System Design

The present apparatus and methods relate to an energy efficient design of a wireless communication system. In particular, in an aspect, the present apparatus and methods may be configured with signal bursts specifically targeted or matched to some discontinuous reception (DRX) periods, either at a user equipment or at a base station, or both. In other optional or additional aspects, the present apparatus and methods may be configured to deal with the resulting uneven distribution of DRX-related traffic. Moreover, in some other alternative or additional aspects, the present apparatus and methods may be configured to make the introduced new time structure of signals backward compatible.

Figure 8:
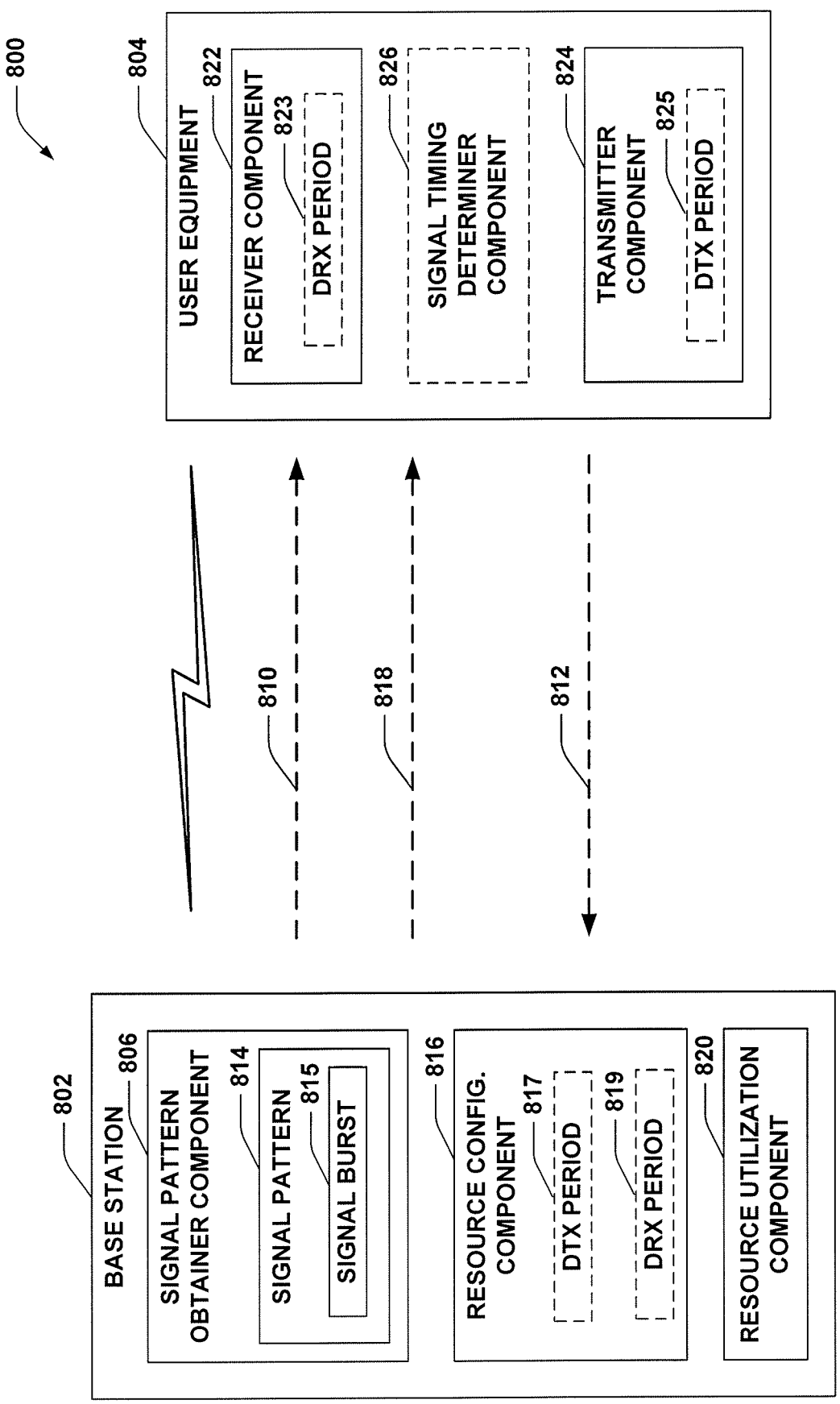
FIG. 8 is a schematic diagram of a wireless communication system including a base station and user equipment configured for improved energy efficiency in signaling.

Referring to FIG. 8, in one aspect, a wireless communication system 800 provides energy efficient signaling by modifying transmission-related and/or reception-related resources of a base station 802 and/or a user equipment (UE) 804 to reduce energy usage. In system 800, base station 802 can provide wireless network access to UE 804. Base station 802 may include, but is not limited to, a macro base station or nodeB or eNB, a femto node, a pico node, a mobile base station, a relay, a remote radio head (RRH), a mobile device (e.g., communicating in peer-to-peer or ad-hoc mode with UE 804), a portion thereof, and/or the like. UE 804 may include, but is not limited to, an access terminal, a mobile device, a modem (or other tethered device), a portion thereof, and/or the like.

In an aspect, base station 802 includes a signal pattern obtainer component 806 configured to obtain a signal pattern 814 defining resources for use in transmitting or receiving signals, e.g. such as transmitted signal 810 or received signal 812. For example, signal pattern obtainer component 806 may obtain signal pattern 814 from a local memory or via a communication with another device. Further, for example, signal pattern obtainer component 806 may be configured to obtain signal pattern 814 based on a determination by signal pattern obtainer component 806. For instance, in one case, signal pattern obtainer component 806 may determine signal pattern 814 by selecting signal pattern 814 from a set of available signal patterns based on a given selection algorithm, by receiving signal pattern 814 as defined by an operator or other management or controlling entity relating to wireless communication system 800. Alternatively, or in addition, signal pattern obtainer component 806 may determine signal pattern 814 by calculating signal pattern 814 according to a given pattern-calculating algorithm and/or in conjunction with received characteristics of wireless communication system 800, such as other signal patterns used by other cells and/or other carriers relative to base station 802.

Additionally, signal pattern 814 may be configured to define variable density signal transmission or reception over time, where the signals include a plurality of signals defining a signal burst 815 aligned with a discontinuous reception (DRX) period. In these aspects, "density" may be defined as a number of resources (for example, resource elements) occupied by the signal across the whole channel bandwidth over a unit time. Further, for example, when the number of such resources varies, the density may be averaged over the given evaluation period. As such, for instance, signal burst 815 may be more dense relative to another set of signals when density is evaluated within a given reference period corresponding to a duration of signal burst 815. Further, the alignment of signal burst 815 with a DRX period may include providing signal burst 815 for transmission in a discontinuous transmission (DTX) period 817 of base station 802 that corresponds to a discontinuous reception (DRX) period 823 of UE 804, or providing signal burst 815 for reception in a DRX period 819 of base station 802 that corresponds to a DTX period of UE 804. The matching of signal burst 815 with a respective DRX period provided by the present apparatus and methods may, for example, improve energy efficiency and/or performance within wireless communication system 800. For example, in one aspect, signal pattern 814 may be a bit mask, however, it should be understood that other techniques and/or mechanism may be used to define signal pattern 814.

Additionally, it should be noted that to achieve the variable density signal transmission or reception, signal burst 815 may be only a portion of the signals defined by signal pattern 814. For instance, in an aspect, signal pattern 814 may provide a first, relatively low, signal density to cause generation of signals having relatively low detectability, e.g., for when UE 804 is already in communication with base station 802 such as for connected mode emergency fast detection. On the other hand, signal pattern 814 may provide a second, relatively high, signal density to cause generation of signals having a relatively high detectability, e.g., signal burst 815, for discovery by UE 804 when UE 804 is not yet in communication with base station 802. In other words, signal pattern 814 may concentrate most discontinuous transmission (DTX) and/or discontinuous reception (DRX) related signaling into relatively short bursts, e.g., signal burst 815, as compared to prior techniques, thereby providing a relatively longer maximum duration without signal present.

For example, in an aspect, signal pattern 814 may define a signal transmission pattern, such as for base station 802 to operate a transmitter to transmit signals, e.g., signals 810, to UE 804. In an aspect, transmitted signals 810 may be, for example, reference signals or broadcast signals transmitted by base station 802. For instance, the reference signals may include, but are not limited to, one or more of a primary synchronization signal (PSS), a secondary synchronization signal (SSS), a common reference signal (CRS), and a channel state information reference signal (CSI-RS). Other broadcast signals transmitted by base station 802 may include, but are not limited to, signals such as a system information signal, or a paging signal.

Further, in an alternative or additional aspect, signal pattern 814 may define transmissions of the first set of signals according to a first periodicity and transmission of the second set of signals according to a second periodicity, wherein the first periodicity is substantially greater than the second periodicity. In other words, when combined with the above noted relative density of the first set of signals relative to the signal burst 815, then the first set of signals provides a relatively shorter maximum duration without signal present as compared to signal burst 815. In some cases, for example, signal pattern 814 configures transmissions of synchronization signals according to the first periodicity to support connected mode emergency detection by UE 804, and transmitting the same set or a different set of synchronization signals according to the second periodicity, e.g. signal burst 815, to support discovery by the UE 804. Additionally, in some aspects, signal pattern 814 configures transmissions of one or more signals with a constant periodicity according to the first periodicity, and transmitting the one or more signals with an irregular periodicity according to the second periodicity. Moreover, in some aspects, signal pattern 814 configures transmissions of one or more signals with different durations between at least one signal in different instances of a given set of signals, or between at least one signal in the different sets of signals having the first periodicity and the second periodicity. In some cases, the differing periodicities, differing sets of signals, and/or differing signal durations may be further defined by a muting configuration or a reuse factor or any other filtering mechanism, where certain ones of the signals are muted or not used at certain instances, associated with signal pattern 814. For example, "muting" of signals means that some of a set of signals may or may not be transmitted in a given period, e.g., based on a given bit mask, muting pattern, signal filter, or some other transmission attribute of a signal or set of signals, etc. Further, in the aspects where signal pattern 814 defines a signal transmission pattern for base station 802, signal pattern 814 may be used to define a discontinuous transmission (DTX) mode of operation for base station 802, and a corresponding discontinuous reception (DRX) mode of operation for UE 804.

It should be noted that while this description uses the example of a first periodicity and a second periodicity, it is understood that the present apparatus and methods include signal pattern 814 defining two or more different periodicities.

Further, in another aspect where signal pattern 814 defines a transmission pattern of base station 802, signal pattern 814 may be used as a basis for obtaining, determining or otherwise defining wake up periods for UE 804 to listen for transmissions from base station 802. For example, signal pattern 814 comprising a base station transmission pattern may define a base station discontinuous transmission (DTX) timing. Accordingly, signal pattern 814 may be used to obtain a wake up configuration for UE 804 that includes a UE signal reception pattern, e.g. a UE DRX, corresponding to the base station DTX timing.

In another example, signal pattern 814 may define a reception pattern, such as a pattern for base station 802 to operate a receiver to receive signals, e.g. signals 812, from UE 804. Alternatively, or correspondingly, signal pattern 814 may define a transmission pattern, such as a pattern for UE 804 to operate a transmitter to transmit signals to base station 802. In an aspect, received signals 812 may be, for example, uplink signals transmitted by UE 804. For instance, the uplink signals may include, but are not limited to, one or more of a data signal, a scheduling request (SR) signal, a channel quality indicator (CQI) signal, demodulation reference signal (DM-RS). sounding reference signal (SRS), and a Physical Random Access (PRACH) signal. In any case, these aspects of signal pattern 814 may be utilized to define a discontinuous reception (DRX) mode of operation for base station 802, and/or a corresponding discontinuous transmission (DTX) mode of operation for UE 804.

As such, in an aspect of this example, signal pattern 814 may define a base station signal reception pattern or a UE signal transmission pattern in which one or more signals are received at base station 802 or are transmitted from UE 804 with different signal densities, and/or with different periodicities. In some cases, for example, signal pattern 814 concentrates uplink signals transmitted by UE 804 into relative short bursts, as compared to prior UE transmission techniques.

Additionally, in some aspects, signal pattern 814 that defines a base station signal reception pattern or a UE signal transmission pattern may be used as a basis for obtaining, determining or otherwise defining one or more random access channel (RACH) configurations for UE 804. For example, signal pattern 814 defining different signal densities and/or different signal periodicities for a signal receiving pattern of base station 802 may be used to define different random access channel (RACH) configurations corresponding to the signal reception pattern having the first periodicity and the second RACH configuration corresponds to the signal reception pattern. For example, the combination of the first RACH configuration and the second RACH configuration may define sparse RACH opportunities corresponding to dormant time of base station 802, and dense RACH opportunities corresponding to active reception time of base station 802.

Additionally, in some aspects, signal pattern 814 may additionally define patterns for control and/or paging signals. For instance, with the variable density DTX and/or DRX configurations described above for base station 802, the paging and/or control signaling load may be relatively high (as compared to prior techniques) during the resulting DTX and/or DRX short burst periods. As such, in one aspect, signal pattern 814 defines different sets of control signals during the different signal density and/or periodicities, as described above. For example, in an aspect, signal pattern 814 defines a number of control signals in a second set of control signals associated with the second, relatively higher, signal density as being substantially greater than a number of control signals in a first set of control signals associated with the first, relatively lower, signal density. Alternatively, or in addition, in another aspect, signal pattern 814 defines transmitting a wake up message, such as but not limited to a quick page on a quick paging channel, wherein the wake up message may include a cross-subframe wake up indicator corresponding to the one or more signals transmitted during the second periodicity. In other words, since certain aspects of the present apparatus and methods may put a large number of UEs in the same DRX wake up period, the base station may have some difficulty, e.g., due to resource constraints, if many UEs need to be woken up at the same time. For instance, the base station typically wakes up a UE by sending a downlink (DL) grant on the PDCCH and an accompanying PDSCH transmission. By providing a wake up message, the present apparatus and methods can skip sending data and just send the grant. As a result, the wake up message of these aspects will wake up the UE, causing the UE to look for retransmissions of the data. Alternatively, or in addition, in some aspects, the present apparatus and methods may not send data in the first subframe, however, the PDCCH can get congested. In either case, the wake up message can relieve the above-noted issued by not sending a full DL grant on the PDCCH and accompanying PDSCH transmission, but just sending a wake up indication to the UE.

Thus, signal pattern 814 defining signal burst 815 aligned with a DRX period results in different signal densities and/or different periodicities providing variable signal density over time, thereby allowing short periods of bursty signal transmission to be followed by substantially lengthy periods without transmissions, as compared to the relatively distributed transmissions of prior art techniques. For example, the first signal density may be substantially less than the second signal density such that, for example, the combination of the first set of signals and the second set of signals provide sufficient dormant periods for improved energy savings while at the same time providing sufficient signaling so as to avoid communication delays and/or user congestion. In other words, the first signal density provides a shorter maximum duration without signal present as compared to the second signal density. Therefore, according to the present apparatus and methods, signal pattern 814 may increase idle time at base station 802 and/or UE 804, thereby improving energy efficiency.

Additionally, base station 802 includes resource configuring component 816 operable to configure base station resources based on signal pattern 814, including aligning a discontinuous reception (DRX) period of UE 804 and/or base station 802 with signal burst 815. For example, resource configuring component 816 may configure a transmitter, receiver, transceiver, transmit chain hardware and/or software, receive chain hardware and/or software, or any other signal-related component to operate to transmit signals 810 or receive signals 812 according to signal pattern 814. It should be noted that in some aspects, signal pattern 814 that defines base station transmissions may be unknown to UE 804. In other optional aspects, however, resource configuring component 816 operates base station 802 to generate and transmit a message 818 to provide UE 804 with information to receive the base station transmissions according to signal pattern 814. For example, message 818 may be a wake up configuration that defines a wake up mode of operation of UE 804 that corresponds to signal pattern 814. In another example, message 818 may include a signal timing indicator that identifies signal pattern 814.

Moreover, base station 802 includes resource utilization component 820 operable to transmit signals 810 or receive signals 812, each optionally including signal burst 815, according to signal pattern 814 to achieve variable density signal transmission or reception over time. For example, resource utilization component 820 may be a transmitter, receiver, transceiver, transmit chain hardware and/or software, receive chain hardware and/or software, or any other signal-related component.

UE 804 of wireless communication system 800 may include a receiver component 822 configured to receive transmitted signals 810, e.g. reference signals, from base station 802. For example, receiver component 822 may be configured to receive signals, including signal burst 815, during DRX period 823, which may be aligned with DTX period 817 of base station 802. Further, UE 804 may include a transmitter component 824 configured to transmit signals 812, e.g. uplink signals, to base station 802. For example, transmitter component 824 may be configured to transmit signals, including signal burst 815, during DTX period 825, which may be aligned with DRX period 819 of base station 802. Receiver component 822 and transmitter component 824 may generally be part of a communications component that includes one or more of a transmitter, a receiver, a transceiver, transmit chain hardware and/or software, receive chain hardware and/or software, or any other signal-related components.

Optionally, UE 804 may include a signal timing determiner component 826 operable to configure receiver component 822 and/or transmitter component 824 to operate according to, or in correspondence with, signal pattern 814. For example, in an aspect, signal timing determiner component 826 may receive message 818, including a wake up configuration or a signal timing indicator, and in response configure receiver component 822 and/or transmitter component 824. For example, upon receiving wake up configuration, signal timing determiner component 826 may configure receiver component 822 to wake up according to periodicities and/or durations corresponding to a base station signal transmission timing. Further, for example, in one aspect of receiving a signal timing indicator that identifies a burstiness, e.g. a signal density, of transmitted signals 810 from base station 802, signal timing determiner component 826 may configure receiver component 822 to wake up according to the burstiness of transmitted signals 810. In other words, signal timing determiner component 826 may configure receiver component 822 to receive signals, including signal burst 815, during DRX period 823, which may be aligned with DTX period 817 of base station 802. In another example, such as an aspect where the signal timing indicator identifies a UE transmission signal timing for signals 812 sent to base station 802, signal timing determiner component 826 may configure transmitter component 824 to transmit according to the signal timing indicator, which can correspond to a DRX mode of operation of base station 802. In other words, signal timing determiner component 826 may configure transmitter component 824 to transmit signals, including signal burst 815, during DTX period 825, which may be aligned with DRX period 819 of base station 802.

Thus, according to the present apparatus and methods, base station 802 and UE 804 of wireless communication system 800 are configured for energy efficient signaling based on modified transmission-related and/or reception-related resources, thereby reducing energy usage. In an aspect, the present apparatus and methods may be applied to transmitting a new carrier type (NCT) or extension carrier, or to any transmission of any of a base station, a user equipment, a relay, a femto node, a remote radio head (RRH), customer premises equipment (CPE) and a user equipment relay. Moreover, in other aspects, the present apparatus and methods may further include coordinating the transmitting or receiving the signals according to the signal pattern with at least one of another cell and another carrier, thereby increasing the efficiency of the overall network or system.

Figure 9:
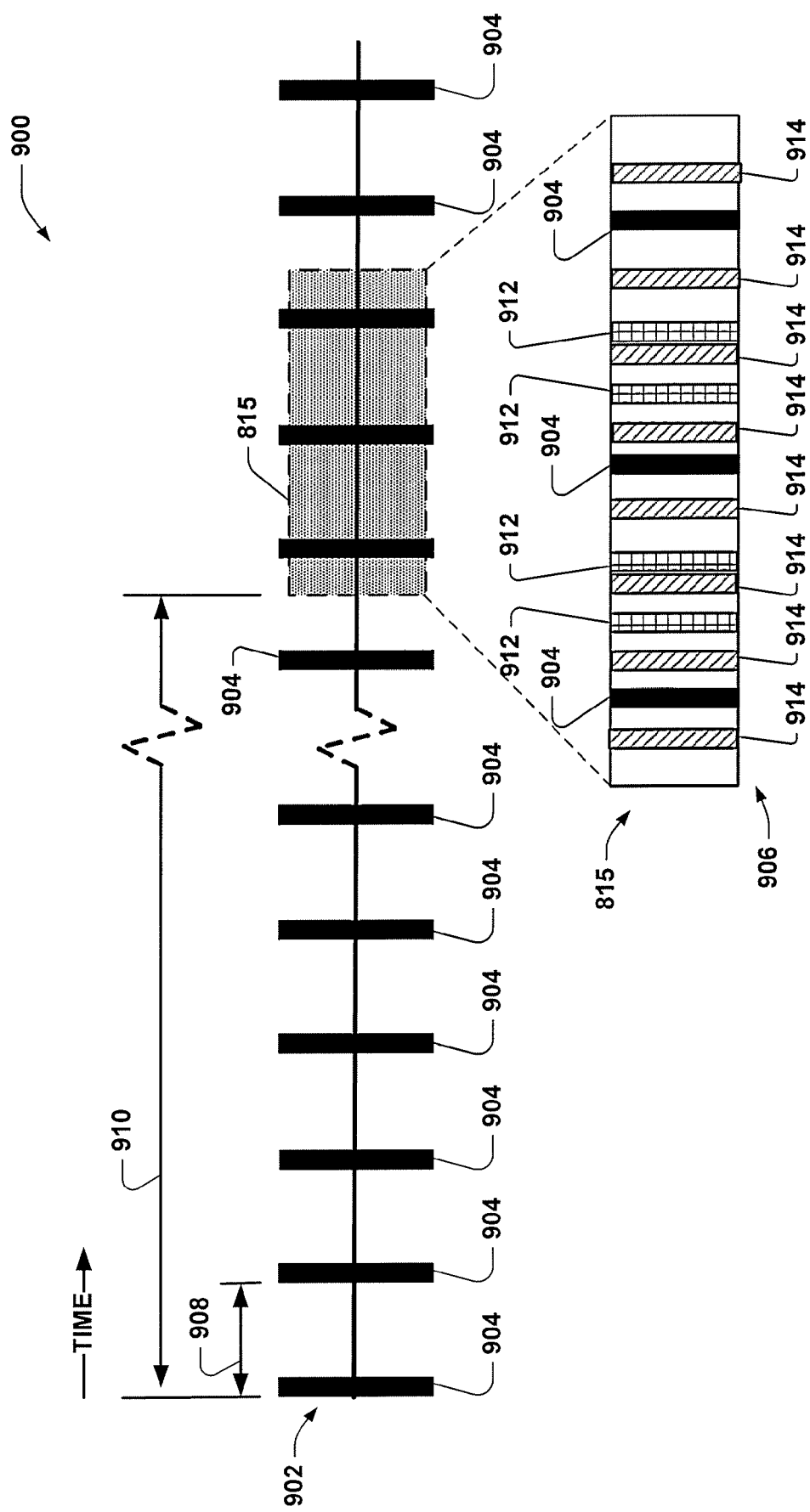
FIG. 9 illustrates an aspect of a signal pattern for use by the base station and/or user equipment of FIG. 8.

Referring to FIG. 9, in one aspect of the present apparatus and methods, an example transmission pattern 900, e.g. which may result from signal pattern 814 (FIG. 8), defines a first set 902 of one or more signals 904 having a first signal density and a second set, e.g. signal burst 815, of one or more signals 906 having a second signal density. Further, for example, in an aspect of transmitting reference or broadcast signals, each of first set 902 and second set, e.g., signal burst 815, may include any combination of one or more of a primary synchronization signal (PSS), a secondary synchronization signal (SSS), a common reference signal (CRS), a channel state information reference signal (CSI-RS), a system information signal, and a paging signal. Also, each type of such signal may have a signal-specific arrangement or configuration that defines membership in a given set or whether the signal is transmitted in a given instance of the set.

It should be noted that, in FIG. 9, the one or more signals 904 of first set 902 have been represented as a single signal, the set of signals transmitted during any given transmission occurrence, which may also be referred to as a density period, may include more than one signal, which may be the same signal or different signals. For example, in an aspect, one or more signals 904 of first set 902 may be a CSI-RS signal that is transmitted in two consecutive symbols or with one extra symbol in between them. In other aspects, for instance, the one more signals 904 of first set 902 may be synchronization signals.

Also, it should be noted that the second set, e.g. signal burst 815, of one or more signals 906 has been represented as a plurality of different signals. Such a plurality of one or more signals 906 may include sets of the same signals or sets of different signals, or variable sets of signals. In one aspect, for instance, the one or more signals 906 of signal burst 815 may include signals 912, such as paging and/or system information signals, and synchronization signals 914. It should be noted that synchronization signals 914 in signal burst 815 may be the same signals as synchronization signals used in the one more signals 904 of first set 902, however, the density of the synchronization signals, e.g. signals 914, in signal burst 815 during the time period or duration of signal burst 815 is greater than a density of the corresponding synchronization signals in first set 902 of one or more signals 904. For example, in one case that is not to be construed as limiting, during the duration of signal burst 815 of FIG. 9, first set 902 includes three (3) signals 904 that may be synchronization signals, while second set or signal burst 815 includes eight (8) signals 914 that may be synchronization signals. As such, the synchronization signals 914 of signal burst 815 are nearly three (3) times as dense as the signals 904 of first set 902 during the duration of signal burst 815.

Moreover, first set 902 of one or more signals 904 having the first signal density and second set, e.g. signal burst 815, of one or more signals 906 having the second signal density may be a same signal or set of signals, or a different signal or set of signals. For example, in one aspect, one or more signals 904 of first set 902 may be a signal that occupies the center 6 resource blocks (RBs) in frequency, while the same 6 RB signal within signal burst 815 may be transmitted on multiple frequencies at the same time. In another example, signal burst 815 may be desired that is denser than the regular 2Tx pattern, but that is understood by legacy UEs so that they can rate match around them. So, in this case, one or more signals 904 of first set 902 may use a 2 transmit (Tx) port CSI-RS pattern, while signal burst 815 may use the same CSI-RS signal but with an 8Tx pattern, where on each antenna the same signal is repeated 4 times. The result is a configuration where the 8Tx pattern can achieve both a density of signal burst 815 greater than a regular 2Tx pattern, and a configuration that can be understood by legacy UEs.

It should be noted that signal burst 815, as illustrated in FIG. 9, is merely a representation of an irregular set of signals, and that other sets and patterns of signals may be included in signal burst 815. The reasons for irregular arrangement can be, for example, one or more of: Different cells use a pseudo-random pattern within signal burst 815 in order to create some interference diversity; the PSS/SSS are transmitted on multiple symbols in a subframe, skipping over CRS symbols, which themselves are somewhat irregular; when signal burst 815 exists in MBSFN subframes, according to certain implemented standards, some subframes may be reserved for other information and thus would not be able to carry signal burst 815, e.g., in some cases signal burst 815 may skip subframes #0, 4, 5, 9 in a ten subframe period, or in other cases signal burst 815 may skip subframes #0 and #5 because these are used for legacy synchronization signals and system information block (SIBs).

Further, first set 902 of one or more signals 904 may have a first periodicity 908, while second set, e.g. signal burst 815, of one or more signals 906 may have a second periodicity 910. In an aspect, for example, first periodicity 908 is substantially different from second periodicity 910. In this figure, for instance, first periodicity 908 is substantially less than second periodicity 910.

In some cases, each of first periodicity 908 and second periodicity 910 may be regular or irregular. For improved energy savings, for example, the transmission of reference signals (e.g., PSS/SSS, CSI-RS, CRS, etc) by base station 802 (FIG. 8) does not need to be "regular," e.g. does not need to have a constant interval. Rather, the transmission may use at least one of at least two different physical constructions of signals, and/or a same signal but with different configurations (e.g., periodicity, muting configuration, reuse factors, etc.). Further, an "irregular" periodicity, e.g. a periodicity having a variable interval, may not be used for energy savings, but can be used for signal detection purposes. For example, PSS and SSS can be arranged with two different periodicities, wherein one periodicity is every 1 second with "infinite" duration (e.g., until another Radio Resource Control (RRC) configuration or broadcast message or signal timing indicator defining a new periodicity), and the other periodicity is every 5 ms for a duration of 20 ms such that PSS and SSS are transmitted in the following subframes 0, 5, 10, 15, 20, 1000, 1005, 1010, 1015, 1020, etc. In this example, the first periodicity serves a "keep-alive" purpose to maintain communications between base station 802 (FIG. 8) and UE 804 (FIG. 8), while the second periodicity is may be defined as "performance-driven," e.g. for a connected mode fast detection, especially for an active UE 804 (FIG. 8).

Additionally, in some aspects, a duration of a given signal transmission period or density period, may vary between first set 902 and second set, e.g. signal burst 815, or between different instances of a given set. Thus, the different periodicities and signal densities of first set 902 of one or more signals 904 and second set, e.g. signal burst 815, of one or more signals 906 provide a signal distribution large enough to create energy savings, but sufficiently close together so as to avoid data communication delays and/or user congestion.

Figure 10:
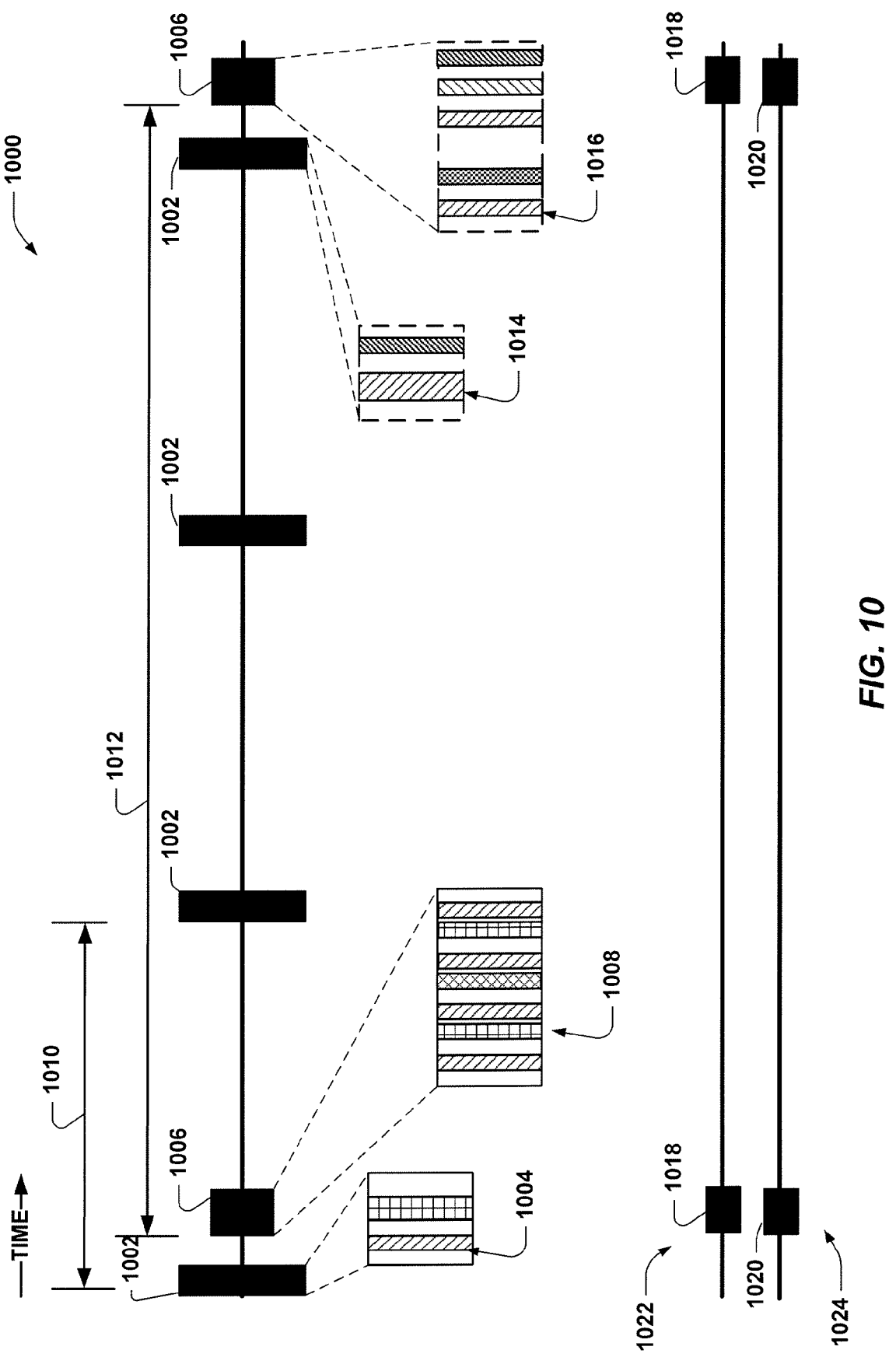
FIG. 10 illustrates another aspect of a signal pattern for use by the base station and/or user equipment of FIG. 8.

Referring to FIG. 10, in one aspect of the present apparatus and methods, another example transmission pattern 1000, e.g. which may result from signal pattern 814 (FIG. 8), defines a first set 1002 of one or more signals 1004 having a first signal density and a second set 1006 of one or more signals 1008 having a second signal density. Further, first set 1002 of one or more signals 1004 may have a first periodicity 1010, while second set 1006 of one or more signals 1008 may have a second periodicity 1012, where first periodicity 1010 is substantially different from second periodicity 1012. In this example, for instance, first periodicity 1010 may be less or substantially less than second periodicity 1012.

Moreover, in some aspects, the one or more signals 1004 of first set 1002 and/or the one or more signals 1008 of second set 1006, at different instances, may each comprise different sets of signals. For example, the first instance of first set 1002 may include signals 1004 while a later instance of first set 1002 may include signals 1014, wherein signals 1014 are a different type and/or number of signals relative to signals 1004. Similarly, the first instance of second set 1006 may include signals 1008 while a later instance of second set 1006 may include signals 1016, wherein signals 1016 are a different type and/or number of signals relative to signals 1008. Further, each type of such signal may have a signal-specific arrangement or configuration that defines membership in a given set or whether the signal is transmitted in a given instance of the set. Alternatively, or in addition, the different signals in each instance of each set may be controlled by a bit map, an attribute or transmission characteristic of each signal or each set of signals, a muting or filtering or reuse pattern, etc.

Additionally, in some aspects, a duration of a given signal may vary between first set 1002 and second set 1006, or between different instances of a given set. Thus, the different periodicities and signal densities of first set 1002 of one or more signals 1004 and second set 1006 of one or more signals 1008 provide a signal distribution large enough to create energy savings, but sufficiently close together so as to avoid data communication delays and/or user congestion.

Additionally, the second set 1006 of one or more signals 1008 may be aligned with DRX periods of one or more UEs that may at least partially receive the one or more signals 1008. For example, in one non-limiting aspect, the second set 1006 of one or more signals 1008 may be aligned with a first set 1022 of one or more DRX periods 1018 of a first UE and a second set 1024 of one or more DRX periods 1020 of a second UE. As such, the one or more DRX periods 1018 of the first UE and the one or more DRX periods 1020 of the second UE are aligned with each other and with the second set 1006 of one or more signals 1008. In an aspect, the DRX periods of UEs in a system according to the present aspects may be set to be the same, e.g., where the one or more DRX periods 1018 of the first UE and the one or more DRX periods 1020 of the second UE may be identically aligned so that they occur in the same time period.

It should be noted that FIGS. 9 and 10 are two examples of transmission patterns, but many other transmission pattern arrangements are contemplated by the present apparatus and methods. For instance, in a simple (but not necessarily the most generic) example, a first set of signals may be a single signal that occurs every 5 ms. Additionally, a second set of signals may occur in every n×1.28 s (e.g., where n could be 16), having a duration of 5 ms, thereby defining a signal burst. For instance, the signal burst may include a dense pattern (which may vary at different instances due to muting, reuse, etc., as discussed above) of duplicates of the same signal as in the first set of signals, where the signal burst may not interrupt the pattern of the first set of signals.

Figure 11:
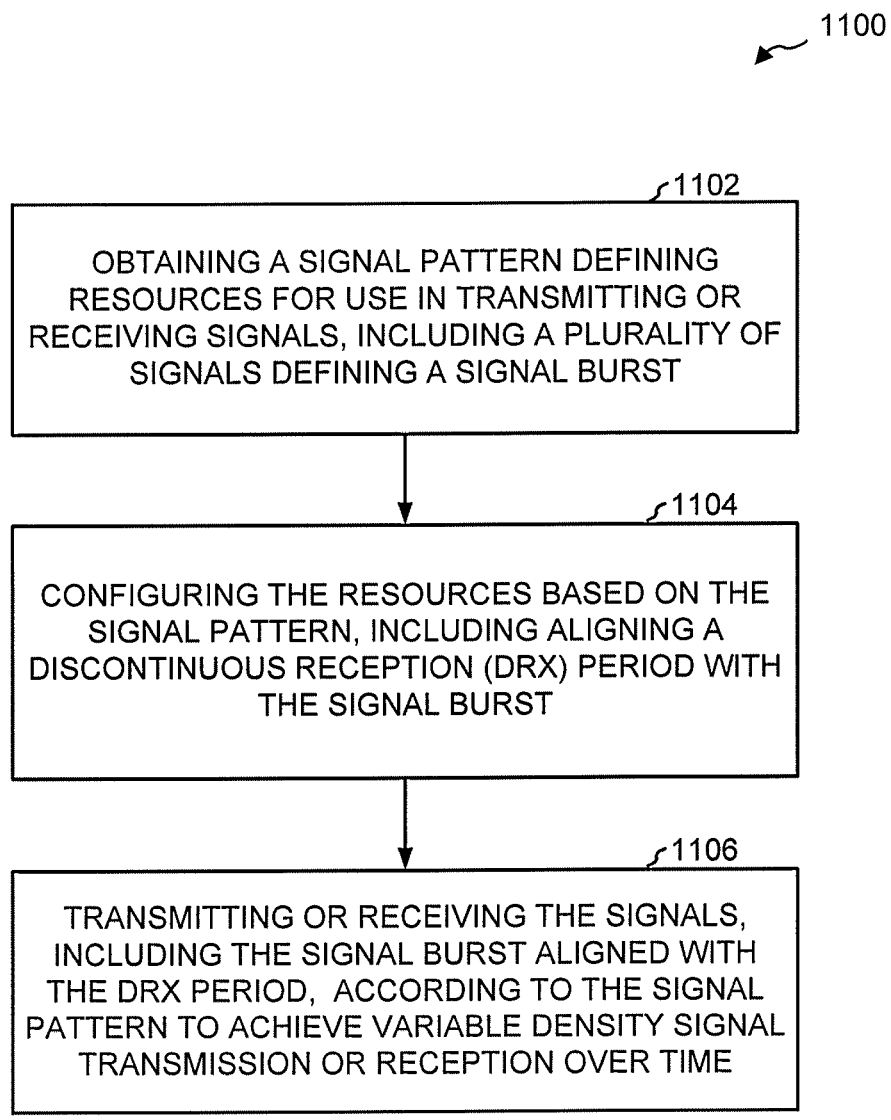
FIG. 11 is a flowchart of an aspect of a method of energy efficient wireless communication.

Referring to FIG. 11, a method 1100 of wireless communication system includes, at block 1102, obtaining a signal pattern defining resources for use in transmitting or receiving signals, wherein the signals include a plurality of signals defining a signal burst.

Additionally, at block 1104, method 1100 includes configuring the resources based on the signal pattern, including aligning a discontinuous reception (DRX) period with the signal burst.

Further, at block 1106, method 1100 includes transmitting or receiving the signals, including the signal burst aligned with the DRX period, according to the signal pattern to achieve variable density signal transmission or reception over time.

Method 1100 may provide an enhanced DTX mode of operation of base station 802 (FIG. 8) and/or an enhanced DRX wake up mode of UE 804 (FIG. 8), as described above.

Alternatively, or in addition, method 1100 may also provide an enhanced DRX mode of operation of base station 802 (FIG. 8), as described above.

Alternatively, or in addition, method 1100 may also provide concentrated, or non-distributed, UE wake up times, e.g. a UE DRX mode of operation corresponding to the base station DTX mode of operation. In this case, method 1100 reduces overhead due a reduction in UE DRX maintenance signaling.

Alternatively, or in addition, method 1100 may also provide enhancements to control signaling and/or page signaling, including increased control overhead during relatively high signal densities and/or transmitting a wake up message with a cross-subframe wake up indication.

Alternatively, or in addition, method 1100 may also include coordinating the transmitting or receiving the signals according to the signal pattern with at least one of another cell and another carrier, thereby increasing the efficiency of the overall network or system.

Figure 12:
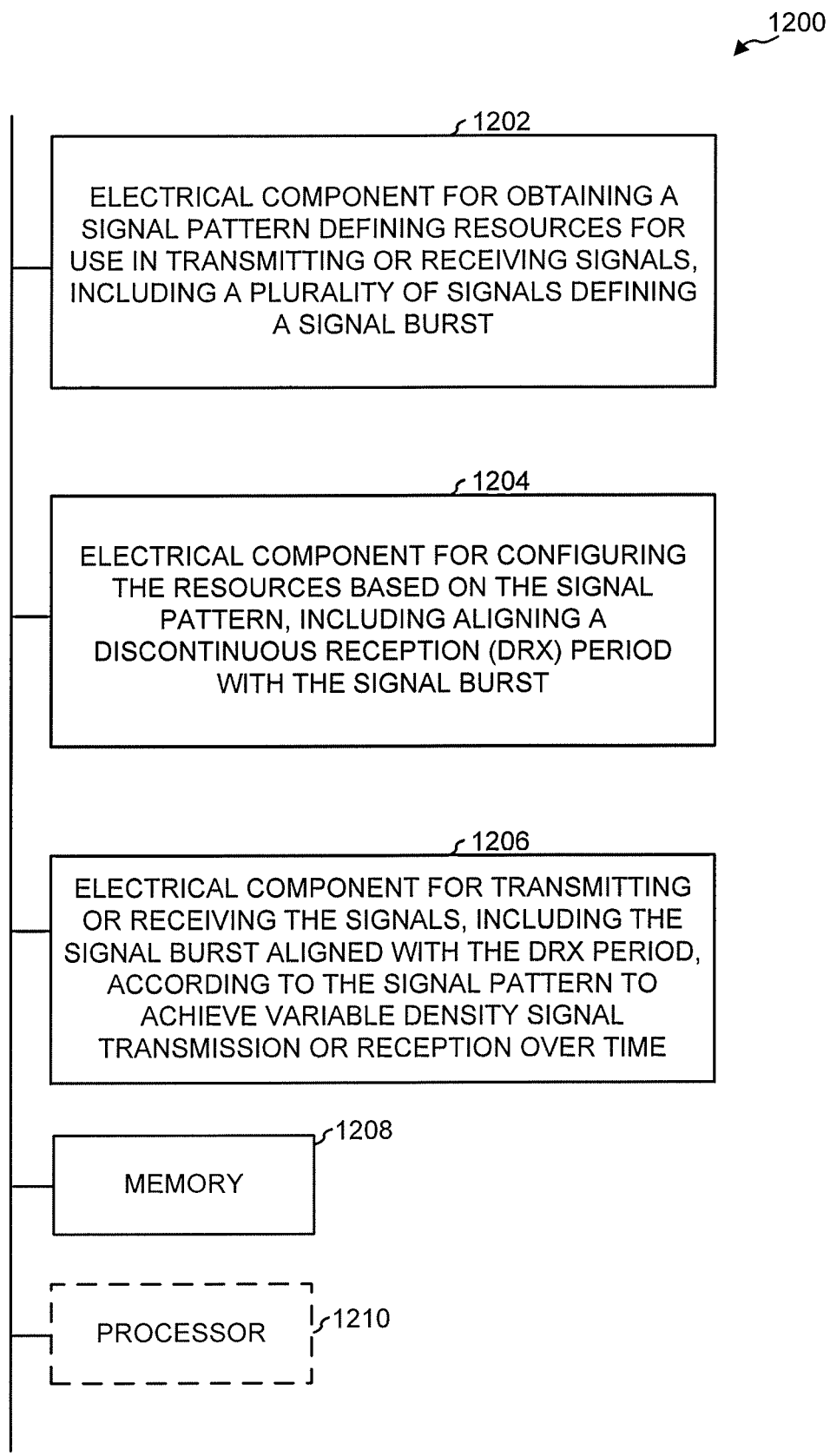
FIG. 12 is a block diagram representation of a portion of a wireless communication apparatus that, for example, may embody or be utilized with the base station and/or user equipment of FIG. 8.

Referring to FIG. 12, in an aspect, a wireless communication apparatus 1200 such as a base station or UE, or a portion thereof, includes an electrical component 1202 for obtaining a signal pattern defining resources for use in transmitting or receiving signals, wherein the signals include a plurality of signals defining a signal burst. Further, apparatus 1200 may include electrical component 1204 for configuring the resources based on the signal pattern, including aligning a discontinuous reception (DRX) period with the signal burst. Additionally, the apparatus 1200 may also include electrical component 1206 for transmitting or receiving the signals, including the signal burst aligned with the DRX period, according to the signal pattern to achieve variable density signal transmission or reception over time.

The apparatus 1200 also includes memory 1208 within which the electrical components 1202, 1204, and 1206 can be implemented. Additionally or alternatively, memory 1208 can include instructions for executing electrical components 1202, 1204, and 1206, parameters related to electrical components 1202, 1204, and 1206, and/or the like.

Alternatively, or in addition, apparatus 1200 can include a processor 1210, which may include one or more processor modules, and which retains instructions for executing functions associated with electrical components 1202, 1204, and 1206, or that executes instructions defined by electrical components 1202, 1204, and 1206. While shown as being external to processor 1210, it is to be understood that one or more of electrical components 1202, 1204, and 1206 can exist within processor 1210.

Thus, the apparatus 1200 may further implement various techniques described herein. In one example, the apparatus 1200 can include base station 802 (FIG. 8) and/or UE 804 (FIG. 8) to perform the techniques described herein.

Figure 13:
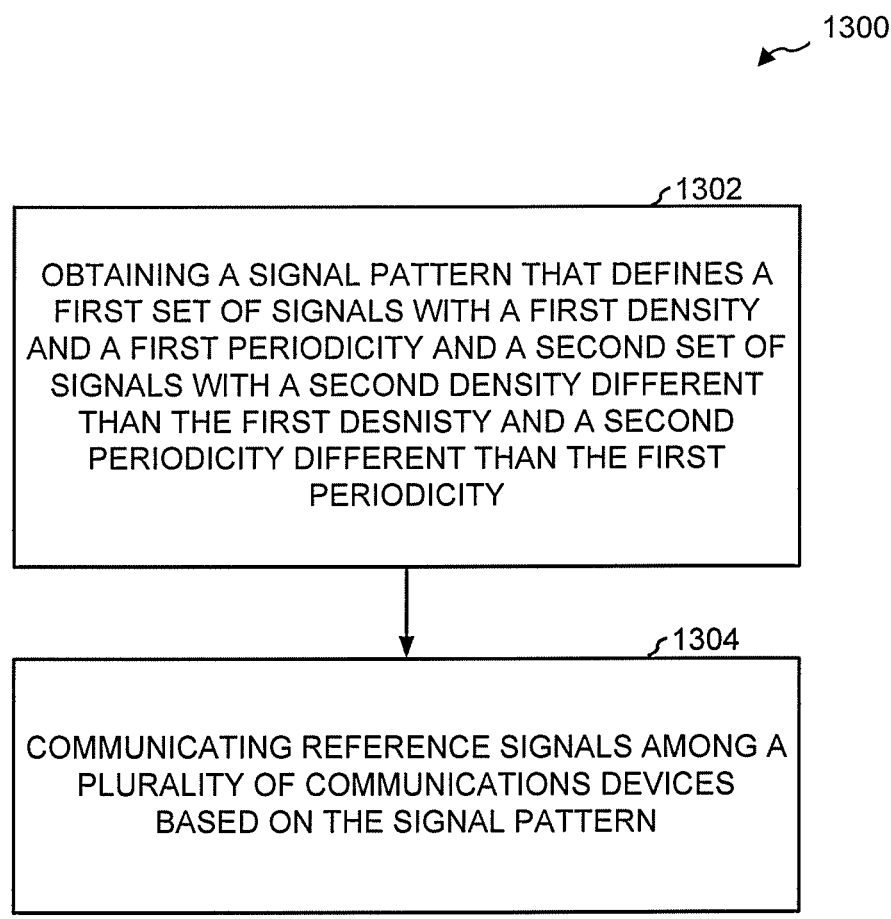
FIG. 13 is a flowchart of an aspect of another method of energy efficient wireless communication.

Referring to FIG. 13, in one aspect, a method 1300 for energy efficient communication is illustrated. Method 1300 may provide an enhanced DTX and/or DRX mode of operation of base station 802 and/or UE 804 (FIG. 8), as described with reference to method 1100. It should be understood that in other implementations, other systems and/or UEs, Node Bs, or communication managers comprising different components than those illustrated in FIG. 8 may be used in implementing method 1300 of FIG. 13.

Method 1300 includes, at block 1302, determining [figure shows obtaining rather than determining] a signal pattern that defines a first set of signals with a first density and a first periodicity and a second set of signals with a second density and a second periodicity.

Additionally, at block 1304, method 1300 includes communicating reference signals among a plurality of communications devices based on the signal pattern.

Method 1300 may provide any of the methods or functions described herein with respect to method 1100.

Alternatively, or in addition, the signal pattern of method 1300 may define signal bursts that correspond to a plurality of aligned discontinuous reception (DRX) or discontinuous transmission (DTX) periods of the plurality of communications devices.

Alternatively, or in addition, in the signal pattern of method 1300, the second density may be greater than the first density and a second period of the second periodicity may be less than a first period of the first periodicity.

Figure 14:
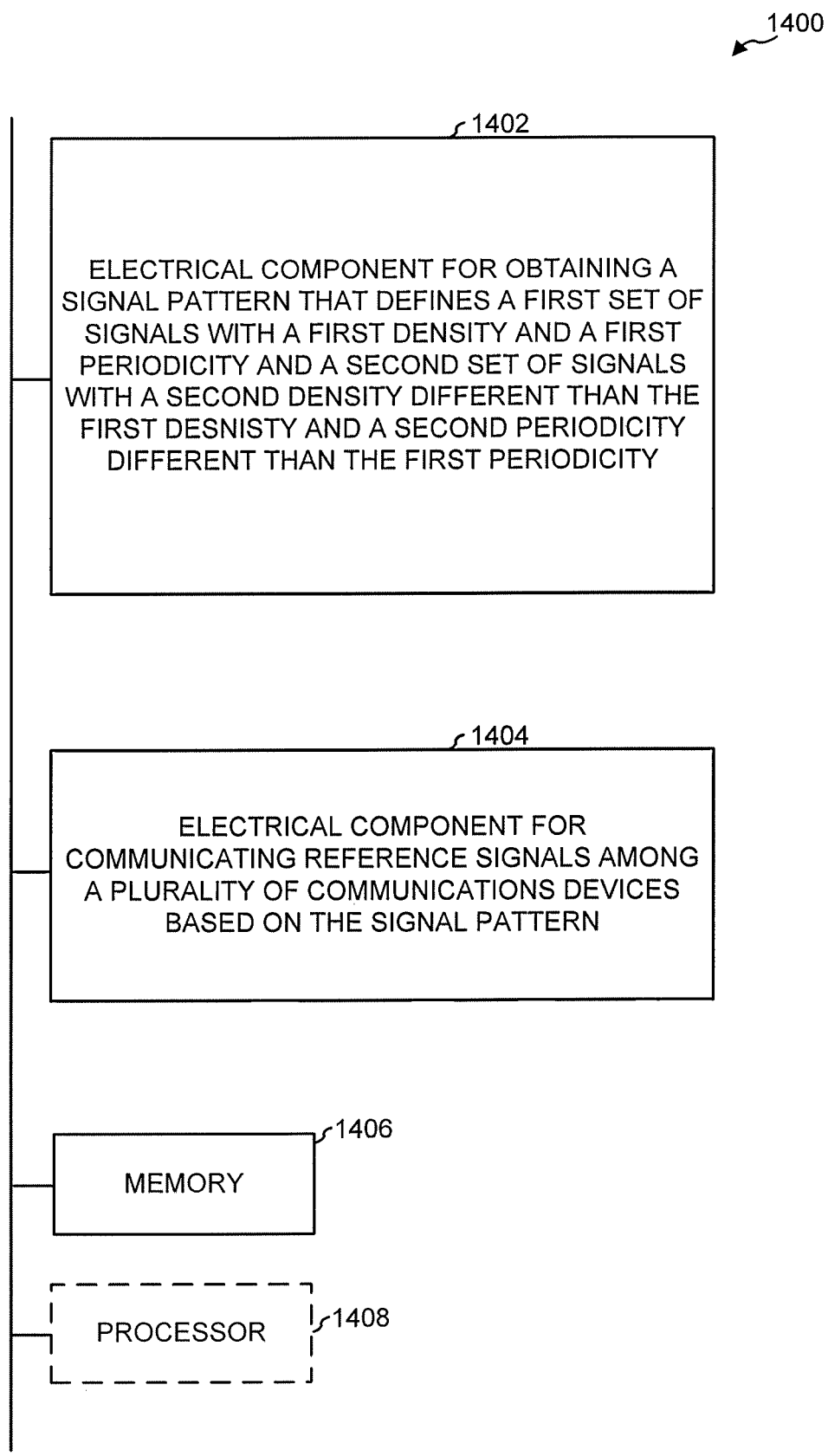
FIG. 14 is a block diagram representation of a portion of another wireless communication apparatus that, for example, may embody or be utilized with the base station and/or user equipment of FIG. 8.

Referring to FIG. 14, in one aspect, a wireless communication apparatus 1400 for energy efficient communication is illustrated. Apparatus 1400 may be base station 802 and/or UE 804 (FIG. 8) or a portion thereof. It should be understood that in other implementations, other systems and/or UEs, Node Bs, or communication managers comprising different components than those illustrated in FIG. 8 may correspond to apparatus 1400 of FIG. 14.

In an aspect, apparatus 1400 such as a base station or UE, or a portion thereof, includes an electrical component 1402 for determining a signal pattern that defines a first set of signals with a first density and a first periodicity and a second set of signals with a second density and a second periodicity. Further, apparatus 1400 may include electrical component 1404 for communicating reference signals among a plurality of communications devices based on the signal pattern.

The apparatus 1400 also includes memory 1406 within which the electrical components 1402 and 1404 can be implemented. Additionally or alternatively, memory 1406 can include instructions for executing electrical components 1402 and 1404, parameters related to electrical components 1402 and 1404, and/or the like.

Alternatively, or in addition, apparatus 1400 can include a processor 1408, which may include one or more processor modules, and which retains instructions for executing functions associated with electrical components 1402 and 1404, or that executes instructions defined by electrical components 1402 and 1404. While shown as being external to processor 1408, it is to be understood that one or more of electrical components 1402 and 1404 can exist within processor 1408.

Thus, the apparatus 1400 may further implement various techniques described herein. In one example, the apparatus 1400 can include base station 802 (FIG. 8) and/or UE 804 (FIG. 8) to perform the techniques described herein.

Figure 15:
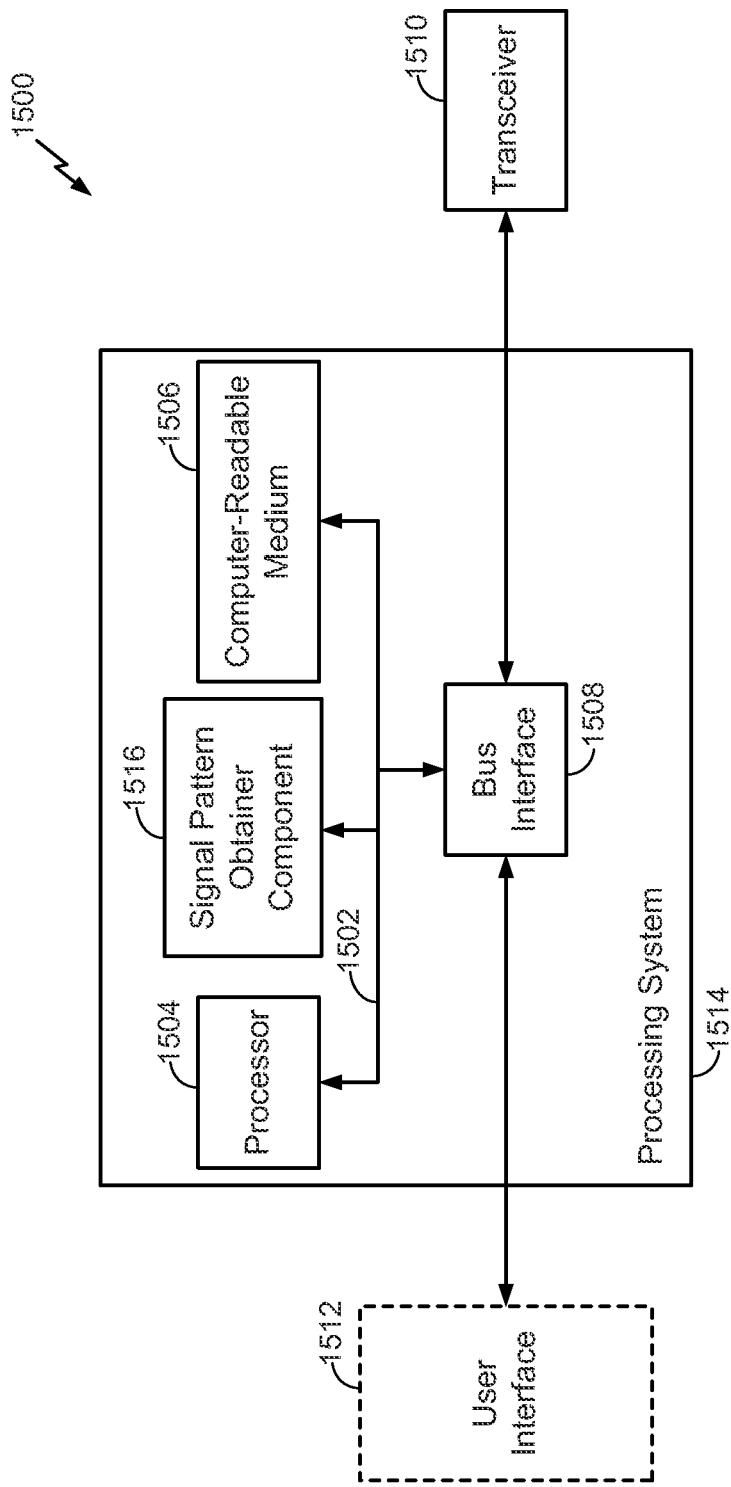
FIG. 15 is a block diagram representation of a portion of yet another wireless communication apparatus that, for example, may embody or be utilized with the base station and/or user equipment of FIG. 8.

FIG. 15 is a block diagram illustrating an example of a hardware implementation for an apparatus 1500 employing a processing system 1514 to operate, for example, base station 802, UE 804, signal pattern obtainer component 806, apparatus 1200, apparatus 1400, (see FIGS. 8, 12, and 14), and/or respective components thereof. In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 links together various circuits including one or more processors, represented generally by the processor 1504, and computer-readable media, represented generally by the computer-readable medium 1506. The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a means for communicating with various other apparatus over a transmission medium. Depending upon the nature of the apparatus, a user interface 1512 (e.g., keypad, display, speaker, microphone, joystick) may also be provided.

The processor 1504 is responsible for managing the bus 1502 and general processing, including the execution of software stored on the computer-readable medium 1506. The software, when executed by the processor 1504, causes the processing system 1514 to perform the various functions described infra for any particular apparatus, such as for executing signal pattern obtainer component 1516 which may be signal pattern obtainer component 806 (see FIG. 8). The computer-readable medium 1506 may also be used for storing data that is manipulated by the processor 1504 when executing software.

Accordingly, in some aspects the present apparatus and methods relate to DRX alignment. For example, in one case, the present apparatus and methods include a base station configured to send and/or receive signals so that the signals align with a UE DRX period, e.g., 40 ms, 1.28 s, or periodically changing some attribute of the signal in alignment with a common DRX period. Further, in some cases, the present apparatus and methods may include a base station configuring all UEs with the same DRX subframe offset (e.g., to make them wake up at the same time) or distributing the DRX subframe offset over a substantially limited set of subframe offsets, where the substantially limited set is smaller than all possible subframe offsets. In still other aspects, the present apparatus and methods include changing some other signal attributes or configuration in alignment with the common DRX period. For example, the changed attribute or configuration may increase a control region during the period when DRX is On, or may allow cross-subframe scheduling during the period when DRX is On, etc. Further, in other cases, the present apparatus and methods may include a base station configuring the common DRX for new UEs and using distributed DRX for legacy UEs. As noted above, the common DRX may be a same DRX period and/or subframe offset assigned to each UE or a subframe offset assigned from a substantially limited set of subframe offsets. Thus, the present apparatus and methods include a base station having DTX aligned with UE DRX.

In other alternative or additional aspects, the present apparatus and methods relate to synchronization signal design. For example, in one case, the same synchronization signal may have different periodicities of different densities where either periodicity may be regular or irregular (e.g., the latter may be described by a bit map) or having a fine structure within one period that may be regular or irregular (e.g., the latter may be described by a bit map). In addition to different periodicity, the signal within each density period may have somewhat different attributes. For example, in a high density period, the PSS/SSS frequency location may be changed or it may be duplicated on multiple frequencies. Another example is using more CSI-RS antenna ports to send the same signal from the same antenna.

In further alternate or additional aspects, the present apparatus and methods may include techniques to provide backward compatibility. For example, in MBSFN or non-MBSFN subframes, the present apparatus and methods can configure zero power CSI-RS (muting) for legacy UEs aligned with the signal with new densities. Further, for example, if muting is already used for legacy UEs for other purposes, then the present apparatus and methods can configure MBSFN subframes aligned with the DRX period and send the "new" signal in the MBSFN portion, e.g., in the subframes defined for carrying MBSFN data. In another case, for instance, the present apparatus and methods may limit a CSI-RS frequency span in these subframes in order to be able to more efficiently multiplex with ePDCCH.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method of energy efficient wireless communication, comprising:
    obtaining a signal pattern defining resources for use in transmitting or receiving signals with variable signal density over time, wherein the signals include a plurality of signals defining a signal burst;
    configuring the resources based on the signal pattern, including aligning a discontinuous reception (DRX) period to correspond to a period of the signal burst; and
    transmitting or receiving the signals, including the signal burst aligned with the DRX period, according to the signal pattern to achieve variable density signal transmission or reception over time;

wherein transmitting or receiving the signals further comprises transmitting the signals in a discontinuous transmission (DTX) period aligned with the DRX period or receiving the signals in the DRX period;

wherein transmitting or receiving the signals further comprises transmitting or receiving a first set of signals having a first density and a first periodicity, and transmitting or receiving a second set of signals having a second density and a second periodicity;

wherein the first density is less than the second density;

wherein the second set of signals comprises the signal burst; and wherein the first periodicity provides a shorter maximum duration without signal present than the second periodicity.

2. The method of claim 1, wherein obtaining the signal pattern further comprises obtaining a transmission pattern, and wherein transmitting or receiving the signals further comprises transmitting the signals according to the transmission pattern in the DTX period of a base station aligned with the DRX period of a user equipment (UE).

3. The method of claim 2, further comprising:
setting a common DRX subframe offset for a plurality of UEs, wherein the UE DRX period of the UE corresponds to the common DRX subframe offset.

4. The method of claim 2, further comprising:
configuring a plurality of UEs with respective UE DRX periods within a set of subframe offsets, wherein the set of subframe offsets is smaller than all possible subframe offsets, and wherein each UE DRX period is based on a different one of the set of subframe offsets; and
transmitting the signals according to the transmission pattern further comprises transmitting in the DTX period of the base station aligned with the respective UE DRX periods of the plurality of UEs.

5. The method of claim 2, wherein transmitting the signals according to the transmission pattern further comprises:
transmitting the first set of signals having the first density; and
transmitting the second set of signals having the second density.

6. The method of claim 5, wherein transmitting the first set of signals having the first density and the first periodicity further comprises transmitting the first set of signals comprising first synchronization signals according to the first periodicity to support connected mode emergency detection by the UE, wherein transmitting the second set of signals having the second density and the second periodicity further comprises transmitting the second set of signals comprising second synchronization signals according to the second periodicity to support discovery of the second synchronization signals by the UE.

7. The method of claim 5, wherein the first periodicity comprises a constant periodicity and the second periodicity comprises an irregular periodicity.

8. The method of claim 5, wherein the first set of signals and the second set of signals comprise either a same set of signals or different sets of signals.

9. The method of claim 5, wherein at least one of the first set of signals or the second set of signals comprises a same set of signals with different attributes within each density period.

10. The method of claim 5, further comprising varying the signals in either the first set of signals or the second set of signals during two or more respective density periods.

11. The method of claim 5, wherein transmitting the signals according to both the first periodicity and the second periodicity further comprises transmitting a set of same signals over different durations during the first periodicity and the second periodicity.

12. The method of claim 2, further comprising:
determining the DRX period of the UE to correspond to the signal burst; and
transmitting a configuration message to the UE to cause configuration of a UE DRX mode according to the DRX period of the UE corresponding to the signal burst.

13. The method of claim 1, wherein transmitting or receiving the signals further comprises transmitting reference signals or broadcast signals.

14. The method of claim 13, wherein transmitting reference signals further comprises transmitting one or more of a primary synchronization signal (PSS), or a secondary synchronization signal (SSS), or a common reference signal (CRS), or a channel state information reference signal (CSI-RS), and wherein transmitting broadcast signals comprises transmitting one or more of a system information signal or a paging signal.

15. The method of claim 1, further comprising:
generating a signal timing indicator that identifies the signal pattern, including the signal burst; and
transmitting the signal timing indicator to one or more user equipments (UEs).

16. The method of claim 1, further comprising:
wherein obtaining the signal pattern further comprises obtaining a reception pattern including the signal burst;
determining the DTX period to be a a UE DTX period of the UE to correspond to the signal burst; and
transmitting a configuration message to the UE to cause configuration of a UE DTX mode according to the UE DTX period.

17. The method of claim 16, further comprising:
configuring the DRX period to be a base station DRX period to correspond to the signal burst of the signal pattern, and
wherein transmitting or receiving the signals further comprises receiving the signals, including the signal burst, in the base station DRX period according to the signal pattern.

18. The method of claim 16, further comprising:
wherein obtaining the reception pattern further comprises obtaining the reception pattern for the first set of signals having the first signal density and the second set of signals having the second signal density;
obtaining a first random access channel (RACH) configuration and a second RACH configuration for the UE, wherein the first RACH configuration corresponds to the reception pattern having the first signal density and the second RACH configuration corresponds to the reception pattern having the second signal density; and
transmitting the first RACH configuration and the second RACH configuration to the UE.

19. The method of claim 16, wherein transmitting or receiving the signals further comprises receiving one or more of a data signal, or a scheduling request (SR) signal, or a channel quality indicator (CQI) signal, or a demodulation reference signal (DM-RS), or a sounding reference signal (SRS), or a Physical Random Access Channel (PRACH) signal.

20. The method of claim 1, further comprising:
wherein obtaining the signal pattern further comprises obtaining a transmission pattern defining the signal burst during the DTX period comprising a base station DTX period;
obtaining a UE wake up configuration for the UE including a UE signal receiving pattern, corresponding to the base station DTX period, and within a set of subframe offsets, wherein the set of subframe offsets is smaller than all possible subframe offsets, and wherein the UE signal receiving pattern is based on the set of subframe offsets;
transmitting the UE wake up configuration to the UE to cause configuration of a UE wake up period according to the base station DTX period; and
wherein transmitting or receiving the signals further comprises transmitting the signals including the signal burst according to the transmission pattern in the base station DTX period corresponding to the UE wake up configuration.

21. The method of claim 1, further comprising:
wherein transmitting or receiving the signals according to the signal pattern further comprises transmitting the first set of signals and the second set of signals; and
transmitting a first set of control signals in the first set of signals and a second set of control signals in the second set of signals, wherein a number of control signals in the second set of control signals during the second signal density is greater than a number of control signals in the first set of control signals during the first signal density.

22. The method of claim 1, further comprising:
wherein transmitting or receiving the signals according to the signal pattern further comprises transmitting the first set of signals and the second set of signals; and
transmitting a wake up message, wherein the wake up message comprises a cross-subframe wake up indicator corresponding to one or more signals transmitted during the second signal density.

23. The method of claim 1, wherein transmitting or receiving the signals according to the signal pattern further comprises transmitting a new carrier type (NCT) or an extension carrier.

24. The method of claim 1, wherein transmitting or receiving the signals according to the signal pattern further comprises transmitting or receiving by at least one of a base station, or a user equipment (UE), or a relay, or a femto node, or a remote radio head (RRH), or a customer premises equipment (CPE), or a UE relay.

25. The method of claim 1, further comprising coordinating the transmitting or receiving the signals according to the signal pattern with at least one of another cell or another carrier.

26. The method of claim 1, comprising:
wherein obtaining the signal pattern obtaining the first set of signals including a set of synchronization signals and obtaining the second set of signals including a set of signal bursts, a period of each signal burst of the set of signal bursts being respectively aligned with a period of a plurality of discontinuous reception (DRX) periods of a plurality of communications devices; and
communicating reference signals among the plurality of communications devices based on the signal pattern.

27. The method of claim 1, wherein
a second period of the second periodicity is less than a first period of the first periodicity.

28. The method of claim 1, wherein at least one of the first periodicity or the second periodicity is irregular.

29. A non-transitory computer-readable medium storing computer executable code for energy efficient wireless communication, comprising:
code for causing at least one computer to obtain a signal pattern defining resources for use in transmitting or receiving signals with variable signal density over time, wherein the signals include a plurality of signals defining a signal burst;
code for causing the at least one computer to configure the resources based on the signal pattern, including aligning a discontinuous reception (DRX) period to correspond to a period of the signal burst; and
code for causing the at least one computer to transmit or receive the signals, including the signal burst aligned with the DRX period, according to the signal pattern to achieve the variable signal density over time;
wherein the code for causing the at least one computer to transmit or receive the signals further comprises code for causing the at least one computer to transmit the signals in a discontinuous transmission (DTX) period aligned with the DRX period or receive the signals in the DRX period;
wherein the signals comprise a first set of signals having a first density and a first periodicity, and a second set of signals having a second density and a second periodicity,
wherein the first density is less than the second density,
wherein the second set of signals comprises the signal burst, and
wherein the first periodicity provides a shorter maximum duration without signal present than the second periodicity.

30. An apparatus for energy efficient wireless communication system, comprising:
at least one processor; and
a memory coupled to the at least one processor;
wherein the at least one processor is configured to:
obtain a signal pattern defining resources for use in transmitting or receiving signals with variable signal density over time, wherein the signals include a plurality of signals defining a signal burst;
configure the resources based on the signal pattern, including aligning a discontinuous reception (DRX) period to correspond to a period of the signal burst; and
transmit or receive the signals, including the signal burst aligned with the DRX period, according to the signal pattern to achieve the variable signal density over time;
wherein the at least one processor configured to transmit or receive the signals further comprises the at least one processor configured to transmit the signals in a discontinuous transmission (DTX) period aligned with the DRX period or receive the signals in the DRX period;
wherein the signals comprise a first set of signals having a first density and a first periodicity, and a second set of signals having a second density and a second periodicity,
wherein the first density is less than the second density,
wherein the second set of signals comprises the signal burst, and
wherein the first periodicity provides a shorter maximum duration without signal present than the second periodicity.

31. The apparatus of claim 30, wherein
a second period of the second periodicity is less than a first period of the first periodicity.

32. The apparatus of claim 30, wherein at least one of the first periodicity or the second periodicity is irregular.

33. The apparatus of claim 30, wherein the at least one processor configured to transmit or receive the signals further comprises the at least one processor configured to transmit the first set of signals comprising first synchronization signals according to the first periodicity to support connected mode emergency detection by the UE, and to transmit the second set of signals comprising second synchronization signals according to the second periodicity to support discovery of the second synchronization signals by the UE.

34. The apparatus of claim 30, wherein the first periodicity comprises a constant periodicity and the second periodicity comprises an irregular periodicity, or wherein the first set of signals and the second set of signals comprise either a same set of signals or different set of signals.

35. The apparatus of claim 30, wherein the signals further comprise reference signals or broadcast signals.

36. The apparatus of claim 30, wherein the at least one processor is further configured to:
   determine the DRX period to be a UE DRX period to correspond to the signal burst; and
   transmit a configuration message to the UE to cause configuration of a UE DRX mode according to the UE DRX period corresponding to the signal burst.

37. The apparatus of claim 30, wherein the signal pattern further comprises a reception pattern including the signal burst; and
   wherein the at least one processor is further configured to:
      determine the DTX period to be a UE DTX period of the UE to correspond to the signal burst; and
      transmit a configuration message to the UE to cause configuration of a UE DTX mode according to the UE DTX period.

38. The apparatus of claim 37, wherein the at least one processor is further configured to:
   obtain a first random access channel (RACH) configuration and a second RACH configuration for the UE, wherein the first RACH configuration corresponds to the reception pattern having the first signal density and the second RACH configuration corresponds to the reception pattern having the second signal density; and
   transmit the first RACH configuration and the second RACH configuration to the UE.

* * * * *